Dec. 29, 1964 R. I. ROTH ETAL 3,163,749

PHOTOCONDUCTIVE COMBINATIONAL MULTIPLIER

Filed June 15, 1961 12 Sheets-Sheet 1

INVENTORS
ROBERT I. ROTH
HAROLD FLEISHER
BY Elmer Galliati
AGENT

Dec. 29, 1964 R. I. ROTH ETAL 3,163,749

PHOTOCONDUCTIVE COMBINATIONAL MULTIPLIER

Filed June 15, 1961 12 Sheets-Sheet 3

| FIG.5a | FIG.5b |
| --- | --- |

PHOTOCONDUCTIVE COMBINATIONAL MULTIPLIER

Filed June 15, 1961

Dec. 29, 1964 R. I. ROTH ETAL 3,163,749

PHOTOCONDUCTIVE COMBINATIONAL MULTIPLIER

Filed June 15, 1961 12 Sheets-Sheet 7

Dec. 29, 1964 R. I. ROTH ETAL 3,163,749

PHOTOCONDUCTIVE COMBINATIONAL MULTIPLIER

Filed June 15, 1961 12 Sheets-Sheet 8

Dec. 29, 1964 R. I. ROTH ETAL 3,163,749

PHOTOCONDUCTIVE COMBINATIONAL MULTIPLIER

Filed June 15, 1961 12 Sheets-Sheet 11

United States Patent Office 3,163,749

Patented Dec. 29, 1964

3,163,749
PHOTOCONDUCTIVE COMBINATIONAL MULTIPLIER

Robert I. Roth, Briarcliff Manor, and Harold Fleisher, Poughkeepsie, N.Y., assignors to International Business Machines Corporation, New York, N.Y., a corporation of New York Filed June 15, 1961, Ser. No. 117,332
12 Claims. (Cl. 235—164)

This invention relates to an arithmetic system and, more particularly, to a device for multiplying.

Generally, in the multiplication devices shown in the prior art, actual partial products of the multiplicand and multiplier are generated and then these partial products are summed to arrive at a final product. The present invention utilizes a different principle, i.e. the principle that the possible partial products of any multiplicand can be generated without knowing the multiplier. The multiplier merely determines which of these possible partial products will be taken into consideration to arrive at the final product.

Furthermore, in the devices shown in the prior art, a separate adder circuit is provided to generate each digit of the final product. The present invention has only one adder circuit and this circuit is used to sequentially generate the various digits of the final product.

An object of the present invention is to provide a simple and economical device for performing multiplication.

A further object of the present invention is to provide a multiplication device which requires a relatively small number of components.

Another object of the invention is to develop a multiplication system which is particularly well suited to mechanization with simple four terminal devices such as cryotrons or lamp-photoconductor combinations.

Yet another object of this invention is to provide a multiplication device with a small number of components wherein the economy in components does not substantially delay the generation of the lower order digits of the product.

Still another object of the invention is to provide a multiplication device wherein all the partial products are initially stored in memory and later read from memory under control of the multiplier.

The multiplication device can conveniently be broken into four major units: (1) a memory for storing the possible partial products of the multiplicand, the carries, and the product; (2) a register for storing the multiplier and for masking the output of the memory in accordance with the value of the multiplier; (3) a logical adder; (4) and means for storing the data produced by said adder in the appropriate positions in the memory. The memory has one "possible partial product" register for each digit of said multiplier, a plurality of carry registers, and a product register.

In order to perform a multiplication, the multiplicand is entered into each of the possible partial product registers in shifted fashion, thereby storing all of the possible partial products of the multiplicand in the memory. The multiplier disables or masks the outputs from those possible partial product registers which contain partial products which should not be included in the final product. Starting with the lowest digital order column, the digital columns of the memory (as masked by the multiplier) are read out into the logical adder. The resulting carries are stored in the appropriate digital positions of carry registers and the digits of the resulting sum are stored in the appropriate positions in the product register. Hence, the digital positions of the final product are generated sequentially starting with the lowest order digital position and ending with the highest order digital position.

The foregoing and other objects, features and advantages of the invention will be apparent from the following more particular description of preferred embodiments of the invention as illustrated in the accompanying drawings.

In the drawings:

FIG. 1 is an overall block diagram of a first preferred embodiment of the invention.

FIG. 1*a* is a timing diagram for the operation of the system of FIG. 1.

Figures 5, 5A:
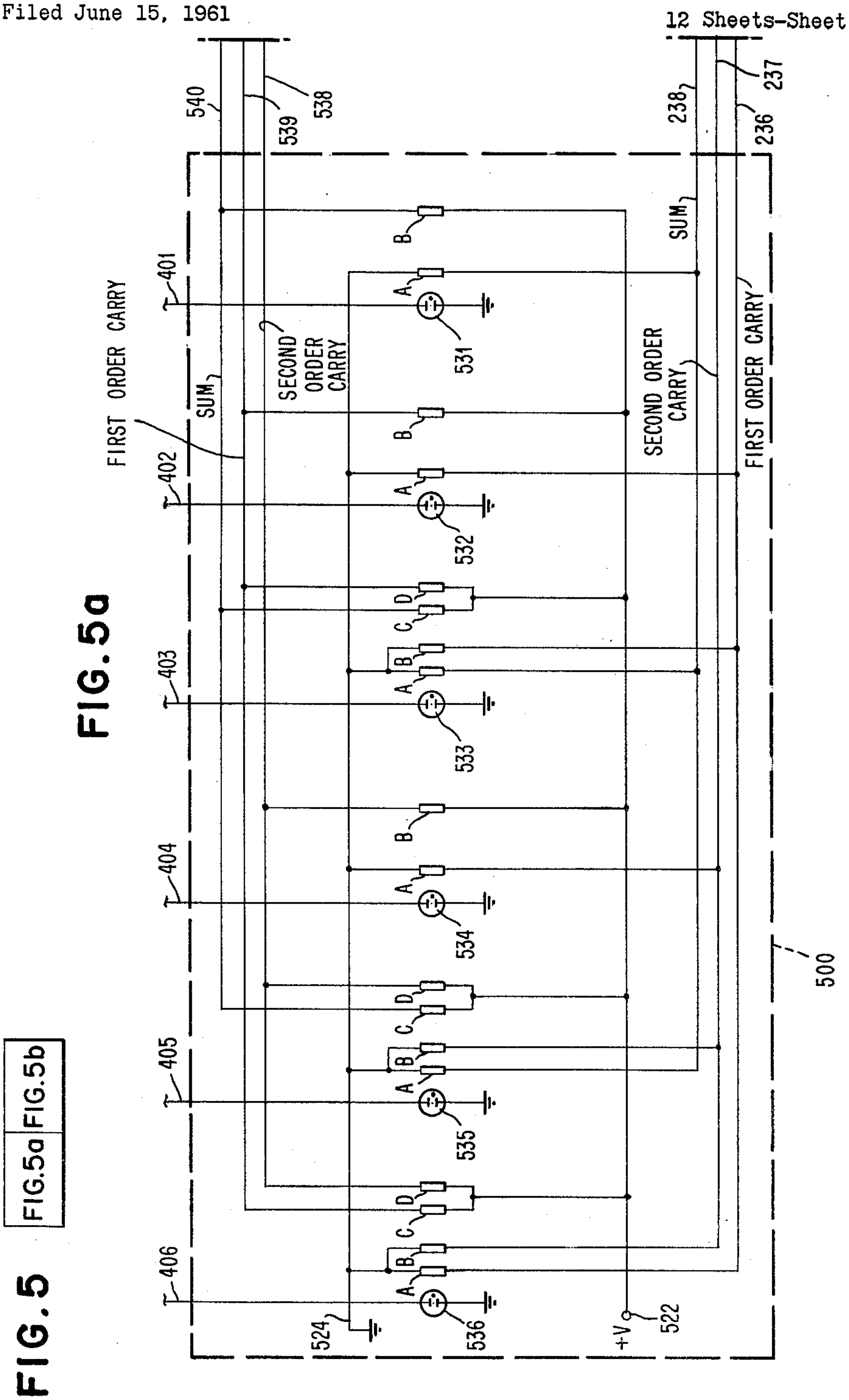
Figure 5B:
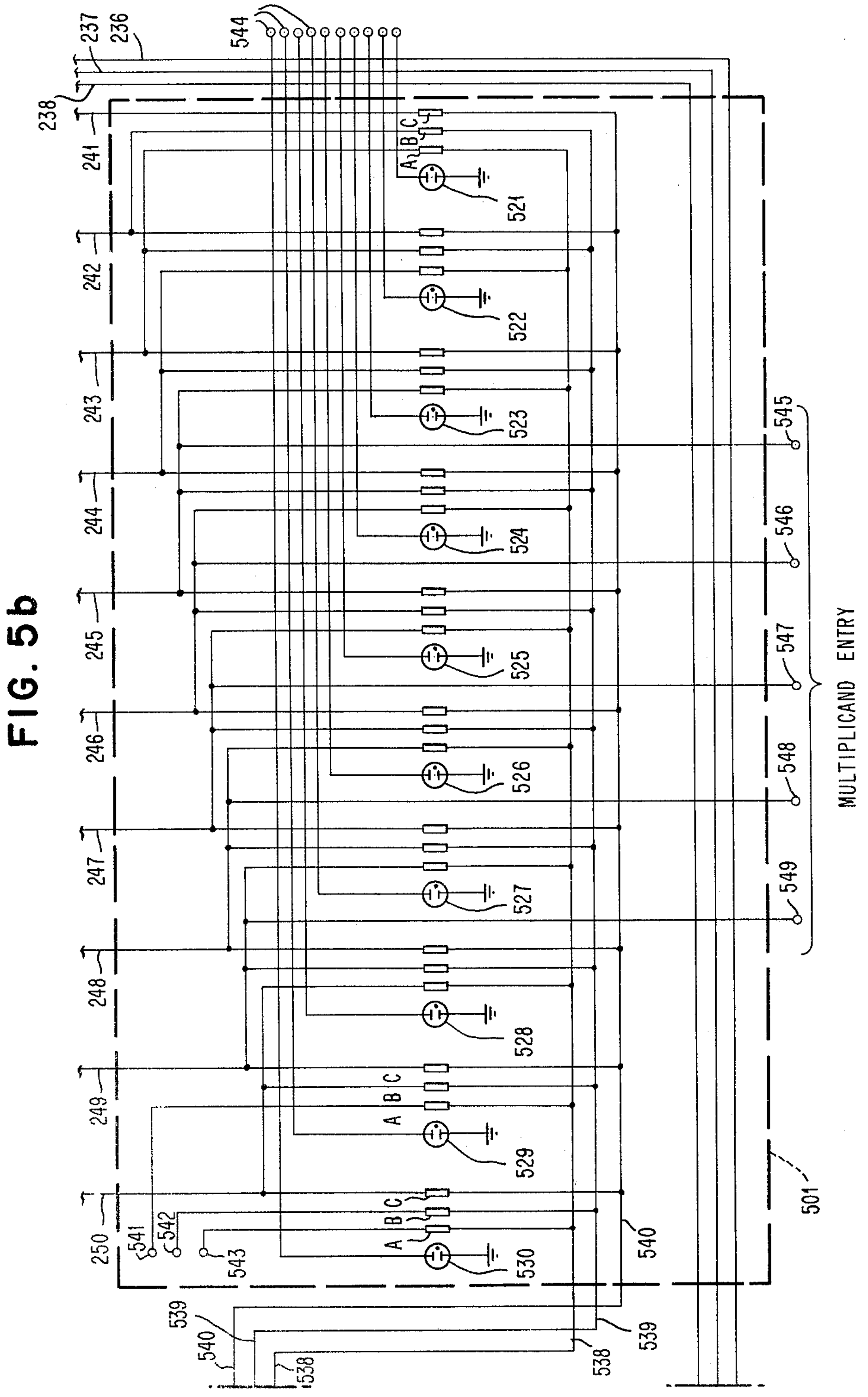

FIGS. 5*a* and 5*b* (which fit together as shown in FIG. 5) are circuit diagrams of the circuitry which stores the sum and carry digits in the appropriate register position.

Figure 6:
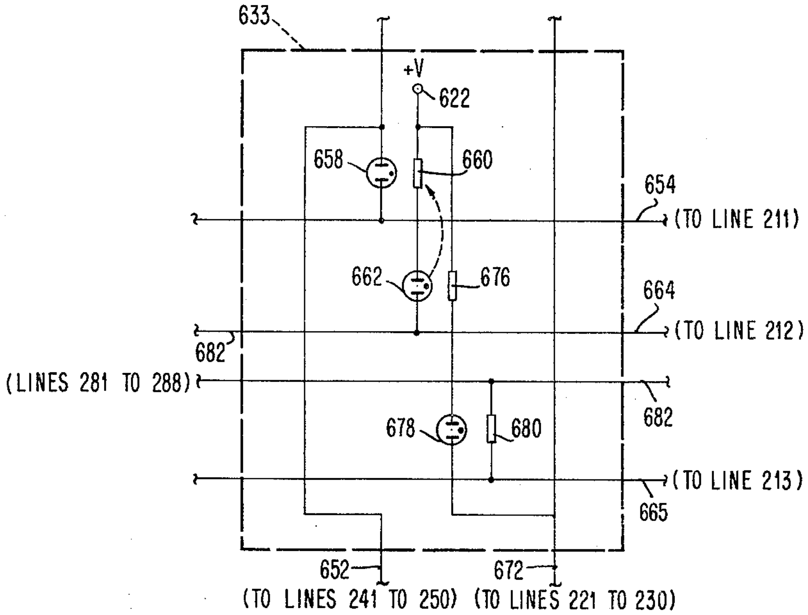

FIG. 6 is a circuit diagram of a representative memory cell.

Figure 7:
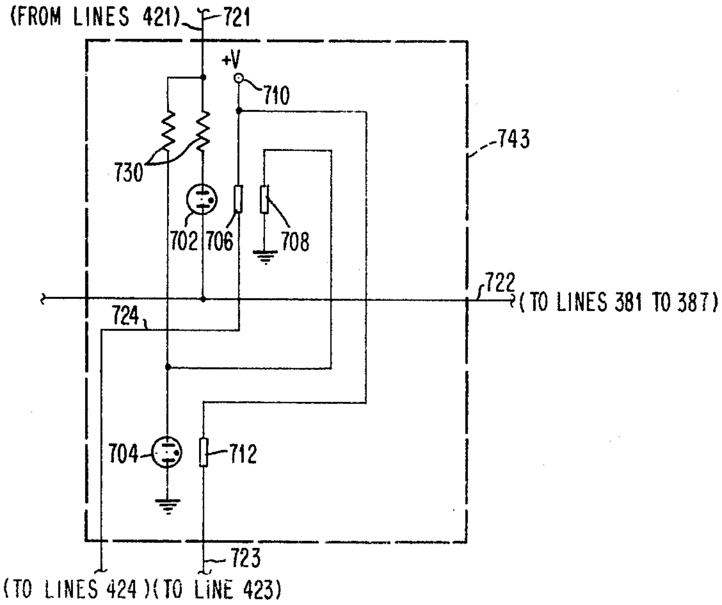

FIG. 7 is a circuit diagram of a representative block of the adding matrix.

Figures 8, 8A:
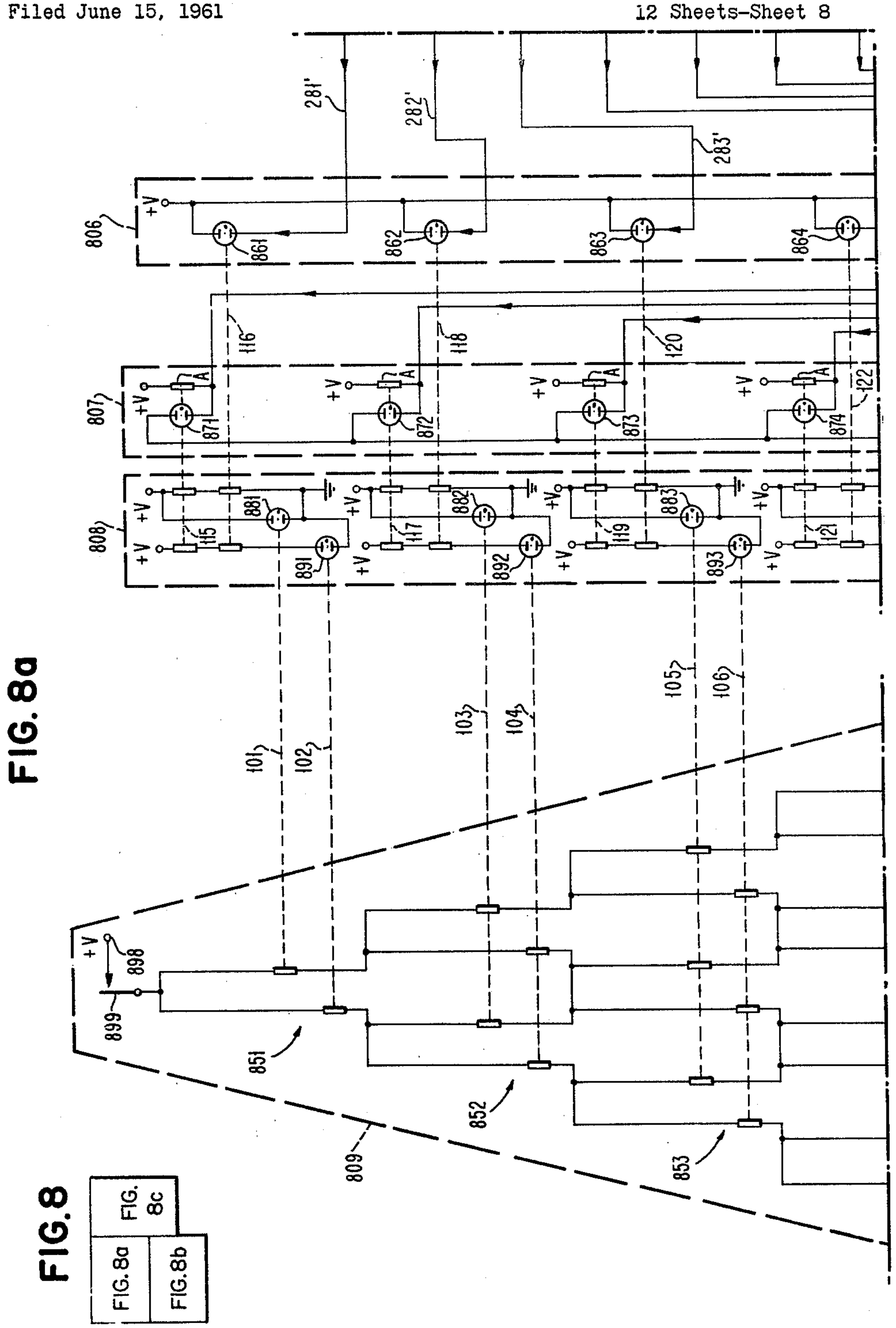
Figure 8B:
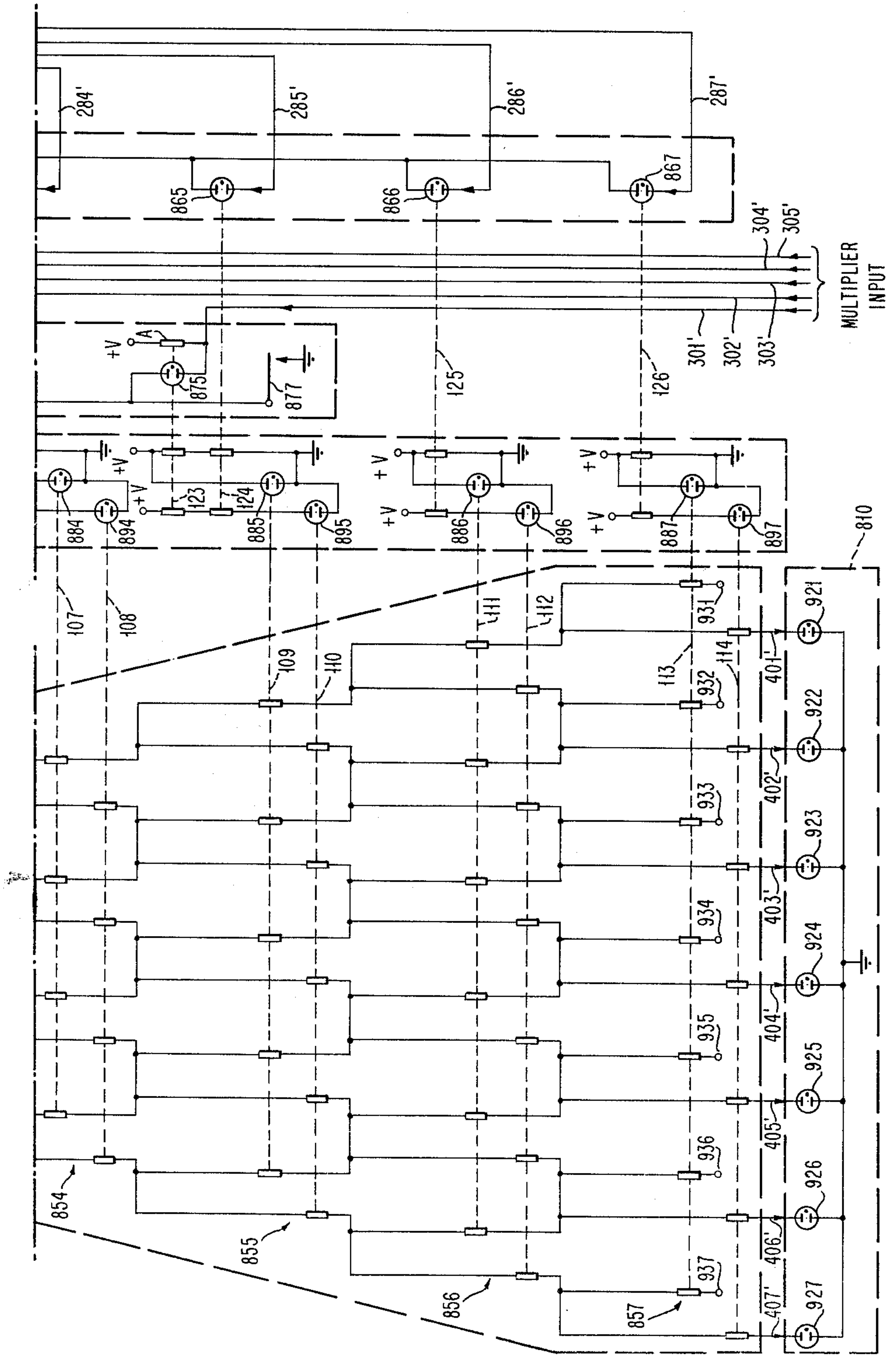
Figure 8C:
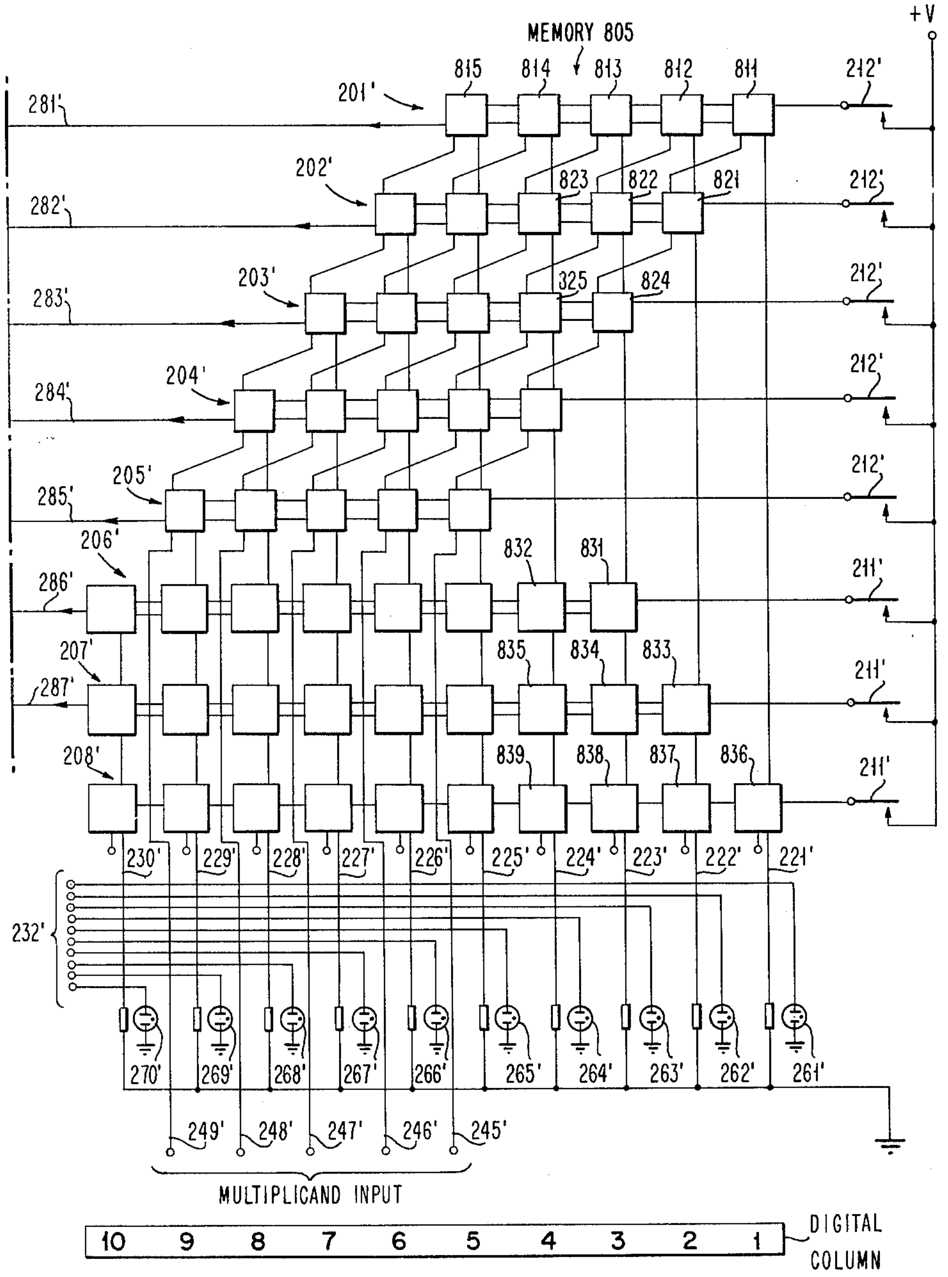

FIGS. 8*a*, 8*b* and 8*c* (which fit together as shown in FIG. 8) are an overall diagram of a second preferred embodiment of the invention.

Figure 9:
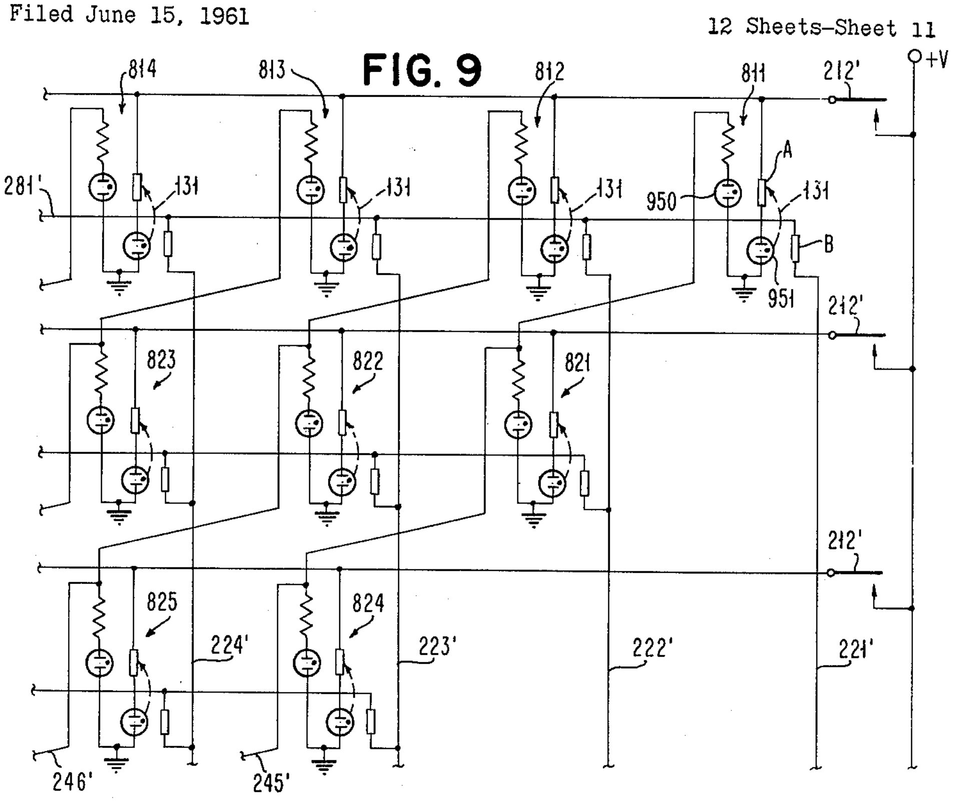

FIG. 9 is a detailed diagram of a portion of the possible partial product registers for the second preferred embodiment.

Figure 10:
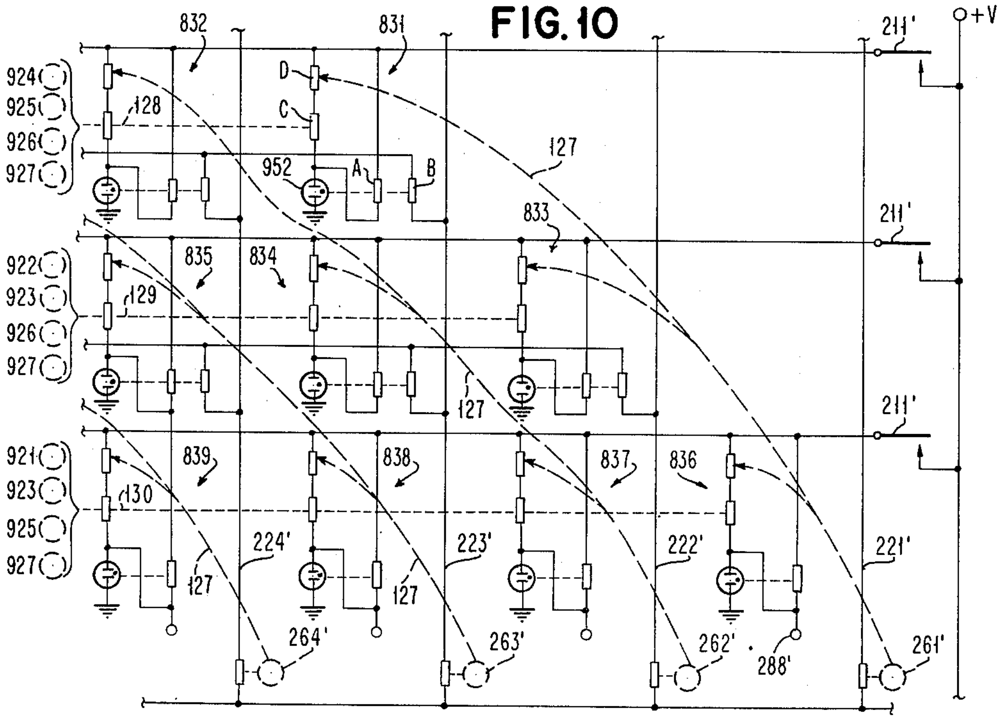

FIG. 10 is a detailed circuit diagram of a portion of the sum and carry registers for the second preferred embodiment.

Figure 11:
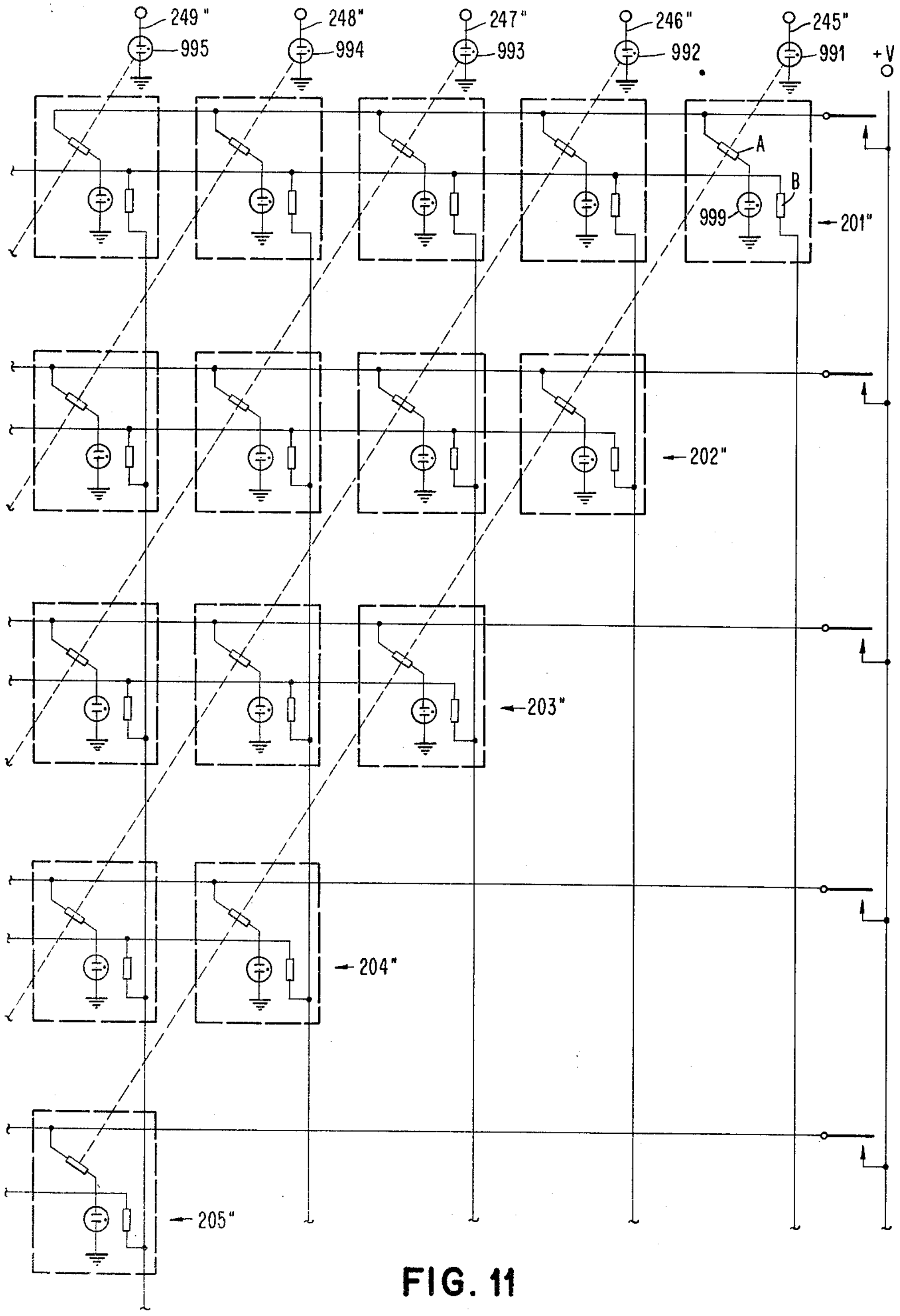

FIG. 11 is a third alternate embodiment of the memory registers.

In order to facilitate an explanation of the embodiment of the multiplication device shown herein, the terminology to be used in describing the multiplication device will first be discussed with reference to the exemplary binary multiplication shown below.

| | 10 | 9 | 8 | 7 | 6 | 5 | 4 | 3 | 2 | 1 | Digital Orders |
|---|---|---|---|---|---|---|---|---|---|---|---|
| (*a*) | | | | | | 1 | 0 | 1 | 1 | 1 | Multiplicand |
| (*b*) | | | | | | 1 | 0 | 1 | 0 | 1 | Multiplier |
| (*c*) | | | | | | 1 | 0 | 1 | 1 | 1 | Actual Partial Product |
| (*d*) | | | | | $\bar{1}$ | $\bar{0}$ | $\bar{1}$ | $\bar{1}$ | $\bar{1}$ | | Not an actual Partial Product |
| (*e*) | | | | 1 | 0 | 1 | 1 | 1 | | | Actual Partial Product |
| (*f*) | | | $\bar{1}$ | $\bar{0}$ | $\bar{1}$ | $\bar{1}$ | $\bar{1}$ | | | | Not an Actual Partial Product |
| (*g*) | | 1 | 0 | 1 | 1 | 1 | | | | | Actual Partial Product |
| (*h*) | | | | 1 | | | | | | | Second Order Carry (C2) |
| (*i*) | | | 1 | 1 | | 1 | 1 | | | | First Order Carry (C1) |
| (*j*) | | 1 | 1 | 1 | 1 | 0 | 0 | 0 | 1 | 1 | Final Product |

In the example shown the multiplicand "twenty-three," expressed in binary notation as "1 0 1 1 1," is multiplied by the multiplier "twenty-one," expressed in binary notation as "1 0 1 0 1," to obtain the product "four hundred and eighty-three," expressed in binary notation as "1 1 1 1 0 0 0 1 1." There are five possible partial products, *c*, *d*, *e*, *f* and *g*; however, since two of the multiplier digits are zero, only three of the possible partial products are actual partial products, that is, only three of the possible partial products *c*, *e* and *g*, are summed to obtain the product.

There are two types of carries; first order carries, C1, where the carry is from one digital order to an adjacent digital order and second order carries, C2, where the carry is from one digital order to a digital order higher by two digital positions.

It should be noted that each of the possible partial products is merely the multiplicand shifted one digital order to the left from the preceding possible partial product. It should further be noted that each possible partial product is associated with a particular multiplier digit.

Figure 1:
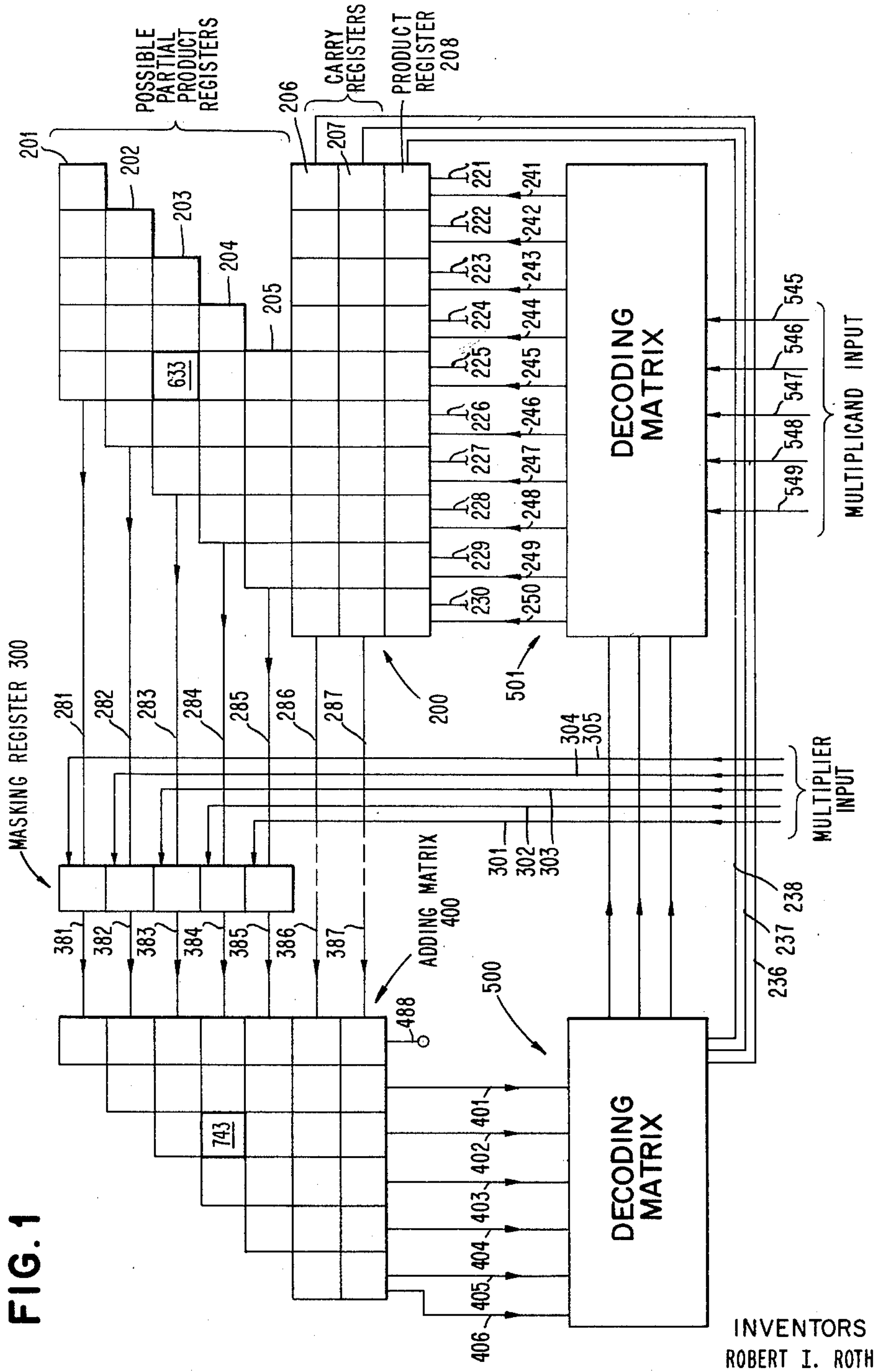

The preferred embodiment of the invention shown herein will now be explained in a general way with reference to the overall block diagram, FIG. 1.

Circuit 200 is a memory which includes registers 201 to 208. Each of these registers has a plurality of bit positions, positions 633 being a representative bit position. Registers 201 to 205 are "possible partial product registers," registers 206 and 207 are carry registers, and register 208 is a register for the final product. The memory has a separate read out line (lines 221 to 230) for each digital order, hence, the value in each digital order of the memory can be read out separately. Each possible partial product register 201 to 205 and each carry register 206 and 207 has a separate output line (lines 281 to 287). The output lines 281 to 287 are activated by the readout lines 221 to 230 in accordance with the information stored in the associated bit position of the respective registers.

A circuit 300 masks (disables) the output lines from those possible partial product registers which contain possible partial products associated with digital positions of the multiplier which are zeros. Hence, masked output lines 381 to 385 are only responsive to information stored in those possible partial product registers which contain actual partial products. Stated conversely, the mask register 300 transmits signals from lines 281 to 285 to corresponding lines 381 to 385 for those digital positions of the multiplier which have a binary value of one.

Circuit 400 is a logical adder and it produces signals on output lines 401 to 406 indicative of the sum and carries of the data on masked output lines 381 to 385 and carry lines 386 and 387.

Circuits 500 and 501 decode the information on output lines 401 to 406 and store the carry digits and the sum digits in the appropriate digital positions of the carry registers 206 and 207 and the product register 208.

The device operates as follows: The multiplicand is entered into each of the possible partial product registers 201 to 205 in a shifted fashion (thereby forming the possible partial products) and the multiplier is entered into the multiplier or masking register 300. Read out lines 221 to 229 are then sequentially activated starting with line 221. As each digital order of the memory is read out by the activation of the associated readout lines 221 to 229 signals appear simultaneously on the register output lines 281 to 287 if there is a "one" stored in the associated bit position.

Those output lines 281 to 285 associated with positions of the multiplier registers 300 wherein a "zero" is stored are masked (disabled) by masking register 300. Hence, adder 400 only receives signals from (*a*) the carry registers 206 and 207 and (*b*) from the possible partial product registers 201 to 205 which contain actual partial products.

As each read-out line 221 to 229 is activated, the bits of the actual partial products in each respective digital order are summed (by circuit 400), the sum digit produced is placed in the appropriate digital position of the product register 208 and first and second order carries are placed in the appropriate digital positions of registers 206 and 207 (by circuit 500 and 501). The sum and carries for the bits in each digital order of the memory as read out and masked by the multiplier are generated and stored in the appropriate digital positions of registers 206, 207 and 208 before the next digital order of the memory is read out. Hence, the digital positions of the product are generated sequentially starting with the lowest order digital position as lines 221 to 229 are activated.

Each of the separate units of the device, i.e. typical memory cell 633, the memory 200, the masking register 300, the typical adding circuit block 743, the logical adder 400, and the means 500 and 501 for storing the data produced by the adder in the appropriate positions of the memory will now be explained separately.

Figure 3:
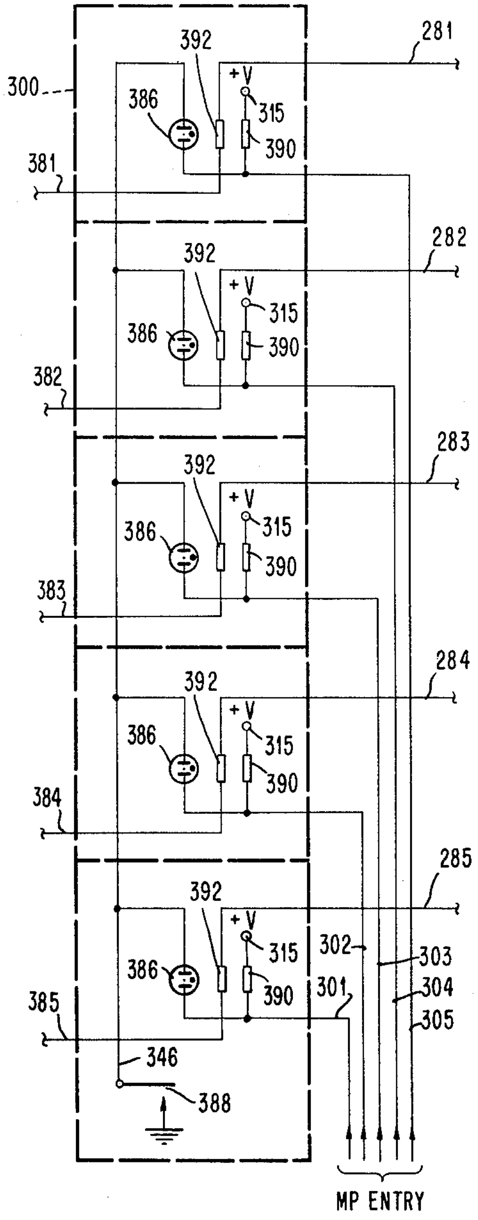
FIG. 3 is a circuit diagram of the masking register.

The characters or numerals which designate the various components of the system have been chosen so as to facilitate understanding and so as to make reference between the specifications and drawings as convenient as possible. All of the major components have been numbered with a different hundreds digit. The hundreds digit designating each unit has been chosen so as to correspond to the number of the figure showing that unit. For example, the masking register is designated by the number 300 and it is shown in FIGURE 3. Furthermore all of the components shown in FIGURE 3 have a three in their hundreds digits. Certain variations from a consistent numbering scheme have been necessary for various reasons, however, an attempt has been made to keep the variations to a minimum.

Figure 2:
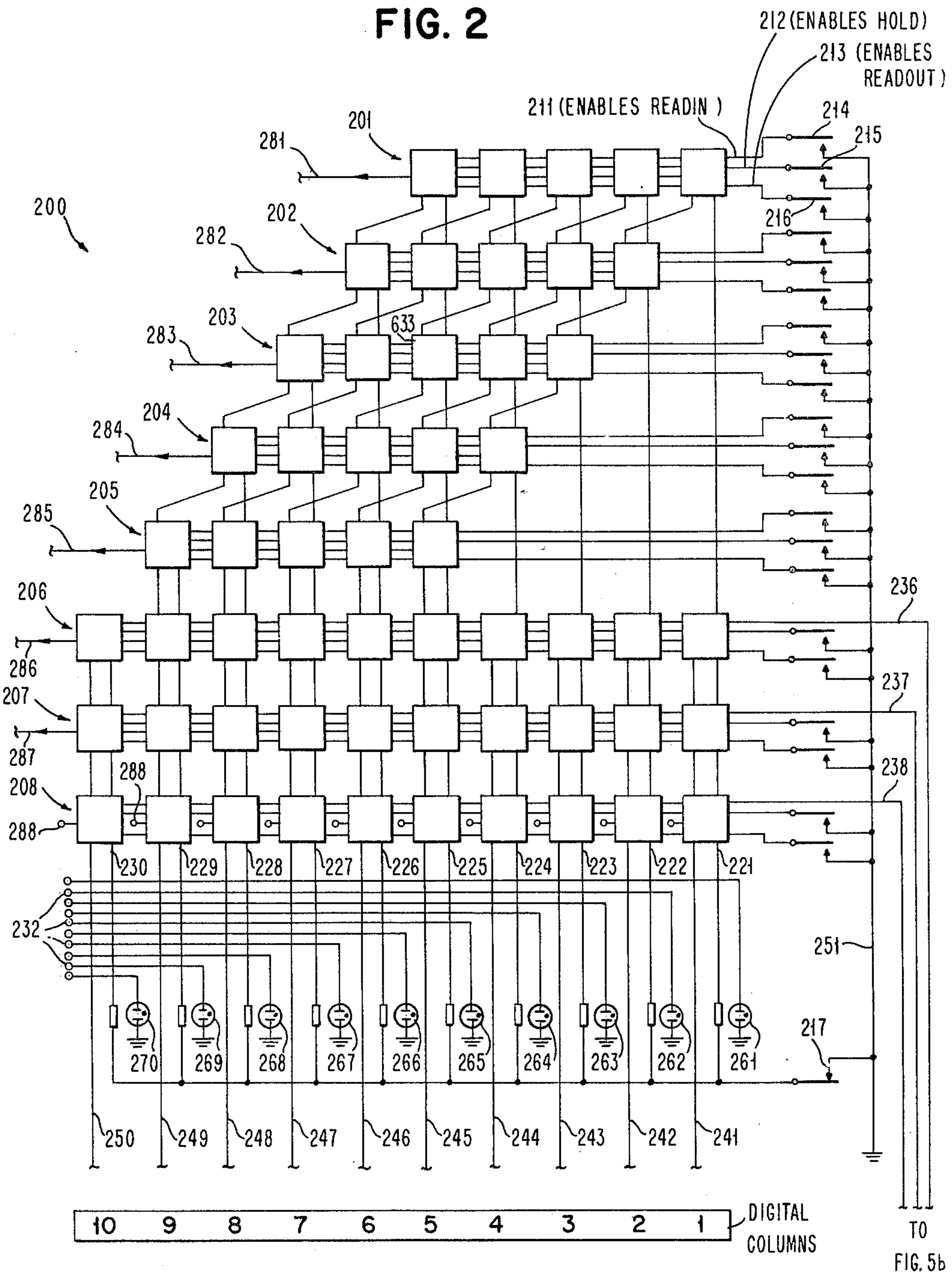
FIG. 2 is a detailed block diagram of the memory registers.

The first circuitry to be explained in detail will be the circuitry in one of the bit positions, such as for example position 633, in memory 200. The block diagram for the memory 200 is shown in FIG. 2 and the circuitry for the bit position is shown in FIGURE 6. The various components of the bit position are designated by a number which has a six in the hundreds digit. It should be noted that the following detailed discussion will begin with the most detailed circuitry (in the highest numbered figures) and following the detailed discussion the less detailed circuitry in the lower numbered figures will again be discussed.

*Typical Memory Cell (FIG. 6)*

Memory cell 633 is typical of the memory cells which form the memory 200. Hence it should be understood that the following description which is particularly directed to cell 633 could also be applied to each of the other cells in the memory 200.

The memory cell 633 has an input line 652, an interrogating line 672, an output line 682, a voltage source 622, three light producing devices 658, 662, and 678 (hereinafter called lamps) and three photoconductors 660, 676, and 680. The physical arrangement (not shown) of the various lamps and photoconductors is such that lamp 658 illuminates photoconductor 660, lamp 662 illuminates photoconductors 676 and 660, and lamp 678 illuminates photoconductor 680.

In order to write information into the memory cell, lines 654 and 664 are connected to ground and a voltage is applied to input line 652. Lamp 658 is thereby activated and it illuminates photoconductor 660 causing photoconductor 660 to exhibit a low resistance. Voltage 622 then activates lamp 662 and since lamp 662 illuminates photoconductor 660, the lamp 662 remains active even though the input voltage is removed from line 652. That is, the memory cell exhibits a latching action.

Information is read out of the memory cell by connecting lines 665 and 672 to ground. If a bit of information had been previously stored in the memory cell, lamp 662 is active and photoconductor 676 is in a low resistance condition; hence, when line 672 is connected to ground lamp 678 is activated and it illuminates photoconductor 680 causing photoconductor 680 to exhibit a low resistance and providing a low resistance path from line 682 to ground. If no information had been previously stored in the memory cell (i.e. if the memory cell is storing a zero) the lamp 662 is not active, photoconductor 676 is in a high resistance state, and hence connecting line 672 to ground will not activate lamp 678 and the photoconductor 680 remains in the high resistance state. It can therefore be seen that the output from the memory cell is manifested on line 682 as a low resistance path between line 682 and ground if the memory cell contains a "one" or as a high resistance path between line 682 and ground if the memory cell contains a "zero."

It should be noted that writing into any particular memory cell is accomplished by the coincident selection of (*a*) one of the registers 201 to 208 by connecting one of the lines 211 to ground and (*b*) one of the columns by selectively actuating (i.e. activating to store a "one" or not activating to store a "zero") one of the lines 241 to 250.

*Memory Unit 200 (FIG. 2)*

The memory 200 consists of eight registers; registers 201 to 205 are possible partial product registers, each of which contain five memory cells; registers 206 and 207 are carry registers each of which contains ten memory cells; and register 208 is a product register which contains ten memory cells.

The number of memory cells here shown in each register is purely exemplary. The possible partial product registers are here shown with five memory cells since the particular embodiment of the device shown here is designed to handle five-digit multiplicands. The carry register would not need as many memory cells as are shown herein (for instance no memory cell would be needed in the lowest order digital position of the carry register); however, for the sake of uniformity each carry register is shown with ten memory cells. Furthermore, these extra memory cells can be used to introduce carries into the product when the multiplication device shown is merely performing part of a larger multiplication.

Each register 201 to 207 has an output line, viz. lines 281 to 287, which is connected to the output line of all of the memory cells in the respective registers. The memory cells which form the product register 208 have individual output terminals 288 so that the product can be read out of the product register in parallel.

Any particular digital column of the memory can be selectively interrogated by activating the associated light source (261 to 270) by applying a voltage to the appropriate terminals 232. Each light source 261 to 270 has associated therewith a photoconductor which is placed in a low resistance state when the light source is activated thereby providing a low resistance path between the associated column readout line 221 to 230 and ground. Each column readout line 221 to 229 is connected to the interrogating input of those memory cells in the associated digital column of the memory. (Note: switch 217 must be closed in order to read information out of any of the memory cells.)

Write lines 241 to 250 are each associated with memory cells in various digital columns of the memory as shown. With respect to the product register 208, the carry registers 206 and 207, and the first possible partial product register 205, each write line 241 to 250 is associated with memory cells in the same digital order and, with respect to the possible partial product registers 205 to 201, each write line shifts to the right one memory cell between each register. Hence, if a number (viz. the multiplicand) is entered into all of the possible partial product registers 201 to 205 at the same time by selectively activating lines 245 to 249, the multiplicand will appear in the possible partial product registers 201 to 205 in a shifted fashion.

With reference to FIG. 6 it can be seen (as previously explained) that in addition to the write line 652, the interrogating lines 672, and the output line 682, each memory cell has three enabling lines, i.e., lines 654 which must be connected to ground before information can be written into the memory cell, line 665 which must be connected to ground before information can be read from the memory cell and line 664 which must be connected to ground in order to keep the cell latched. As shown in FIG. 2, each possible partial product register 201 to 205 has three lines 211, 212 and 213 which can be selectively connected to ground by switches 214, 215, and 216, and these lines are respectively connected to the enabling lines 654, 665, and 664 of the memory cells in their respective registers. Hence, with respect to each register 201 to 205 switch 214 must be closed before information can be read into the register, switch 215 must be closed before the register will latch, and switch 216 must be closed before information can be read from the register. It should also be noted that all the memory cells in any register which are latched may be unlatched by opening the associated switch 215.

Registers 206, 207 and 208 each have switches 215 and 216 which operate identically as to the corresponding switches in registers 201 to 205; however, the registers 206, 207 and 208 do not have switch 214. Instead the lines from registers 206, 207 and 208, i.e. lines 236, 237 and 238 (which are equivalent to lines 211 in registers 201 to 205) which control whether or not information can be written into the respective registers, go into circuit 501. The purpose of this will be seen later.

Switches 215 operate to clear the memory, hence these switches are all closed before the multiplication is started and they all remain closed until the multiplication is finished (opening switches 215 clears the memory).

As previously explained, during the initial step in the multiplication, the multiplicand is entered into the possible partial product registers in shifted fashion. This is done by closing switches 214 for registers 201 to 205 and open-circuiting lines 211 for registers 206, 207 and 208 (circuit 501 does this as will be explained later) and by then selectively activating lines 245 to 249 in accordance with the multiplicand. After the multiplicand has been entered into the possible partial product registers 201 to 205 switches 214 for these registers can be opened. Once switches 214 are opened, write lines 221 to 250 can be used to store carry digits in registers 206 and 207 and product digits in register 208 without in any way affecting the information which is stored in the possible partial product registers 201 to 205. Information is stored in the carry registers 206 and 207 and in the product register 208 by selectively connecting lines 211 which are associated with these registers to ground and coincidentally selectively activating read-in lines 241 to 250.

While the multiplication is being performed switches 216 in registers 201 to 207 are closed so that the bit positions of these registers can be read out by selectively activating light sources 261 to 270. Once a product has been generated, it can be read out of the product register in parallel on output lines 288 without in any way affecting the information stored in the possible partial product registers 201 to 205, by opening switches 216 in possible partial product registers 201 to 205 and closing switch 216 in register 208 and then simultaneously activating the light sources 261 to 270.

As will be explained in detail later, during certain types of operations the digits of the products are not placed in register 208, instead they are gated directly to other logical circuitry as they are generated.

*Masking Register 300 (FIG. 3)*

The masking register 300 provides means for storing the multiplier and for masking or disabling selected possible partial product register output lines 281 to 285. The register 300 has five bit positions, i.e., one for each digit of the multiplier.

Each bit position of the register 300 has a light source 386 and two photoconductors 390 and 392 which are illuminated by the respective light source. The multiplier is entered into the register on five input lines 301 to 305 and the register is cleared by a switch 388 which connects lines 346 to ground. The light sources 386 are connected between line 346 and their respective multiplier entry lines; the photoconductors 390 are connected between the voltage supplies 315 and their respective multiplier entry lines; and the photoconductors 392 respectively connect the various possible partial product register output lines 281 to 285 to the corresponding masked possible partial product register output lines 381 to 385.

The multiplier is entered into the register by closing switch 388 and selectively activating multiplier register input lines 301 to 305. Activation of the multiplier entry lines 301 to 305 selectively activates the light sources 386, and once a light source 386 is activated by a multiplier entry line it is maintained active through the associated photoconductor 390; hence, the masking register 300 stores the multiplier. It will be recalled that a "one" signal is indicated on lines 281 to 285 by the registers 201 to 207 by providing a low resistance path between the particular line and ground. There can be a low resistance path between any masked possible partial product register output lines 381 to 385 and ground only if there is a low resistance path between ground and the respective possible partial product register output lines 281 to 285 and the respective light source 386 is active causing the respective photoconductor 392 to be in the low resistance state (i.e., a "one" stored in the particular digital position of the masking register). Hence, irrespective of the condition of possible partial product register output lines 281 to 285 there will be a high resistance between masked partial product register output lines 381 to 385 unless there is a "one" stored in the respective bit position of the masking register 300.

*Adding Circuit Block 743 (FIG. 7)*

Block 743 is typical of the blocks or cells which form the adding matrix 400. Hence, it should be understood that the following description which is particularly directed to the typical cell or block 743 could also be applied to each of the other blocks in the adding matrix 400.

The cell 743 has two input lines 721 and 722 and two output lines 723 and 724, and two lamps 702 and 704. Lamp 702 is connected between input line 721 and the input line 722 and lamp 704 is connected between input line 721 and ground. The cell has three photoconductors, 706, 708 and 712. Photoconductors 706 and 708 are positioned so that they are illuminated by the lamp 702 and photoconductor 712 is positioned so that it is illuminated by the lamp 704. Each lamp has a resistance 730 in series therewith to limit the current flow through the lamp.

The cell operates as follows: if there is no voltage applied to input line 721, neither of the lamps 702 nor 704 is active and, hence, all of the photoconductors are in the high resistance state and there is a high resistance path between the voltage supply 710 and both of the output lines 723 and 724; if a voltage is applied to the input line 721 and there is not a low voltage path between line 722 and ground, the lamp 704 is activated, thereby causing photoconductor 712 to be in the low resistance state and establishing a low resistance path between voltage supply 710 and output line 723; if a voltage is applied to input line 721 and there is a low resistance path between input line 722 and ground, the lamp 702 is activated, thereby causing photoconductors 706 and 708 to be in the low resistance state, hence there is a low resistance path between voltage supply 710 and output line 724 and furthermore, the low resistance path through photoconductor 708 keeps the lamp 704 extinguished and thereby hold photoconductor 712 in the high resistance state.

Depending upon whether the outside circuitry supplies a voltage to input line 721 and whether it provides a low resistance path between input line 722 and ground, the output lines of the memory cell can be in one of the three conditions outlined above, i.e. (1) there is a low resistance path between voltage supply 710 and output line 724 and a high resistance interposed between voltage supply 710 and output line 723, (2) there is a low resistance path between voltage supply 710 and output line 723 and a high resistance interposed between voltage supply 710 and output line 724, or (3) there is a high resistance interposed between the voltage supply 710 and both lines 723 and 724. The interaction between the various blocks of the adding matrix will be explained with reference to FIG. 4.

*Adding Matrix 400 (FIG. 4)*

The adding matrix 400 consists of six columns and four rows of blocks similar to block 743 which was previously described. The matrix has seven input lines, 381 to 387, and seven output lines 401 to 406 and 488.

Input signals representing "ones" and "zeros" are manifested on the input lines 381 to 387 by a low resistance path between the respective input line and ground to indicate a "one" and a high resistance path between the respective block, the input lines 381 to 387 entering the side put signals from the circuit are manifested by providing a low resistance path between a voltage supply and the respective output line on which the signal is to be manifested. Hence, it can be said that the output signals are manifested as voltages on the output lines. The various outputs indicate the following information: a voltage on output line 401 indicates that there is a "one" signal on one of the input lines 381 to 387; a signal on output line 402 indicates that there is a "one" signal on two of the input lines 381 to 387; a signal on output line 403 indicates that there is a "one" signal on three of the input lines 381 to 387, etc., until a signal on output line 406 indicates that there is a "one" signal on six of the input lines 381 to 387.

Figure 4:
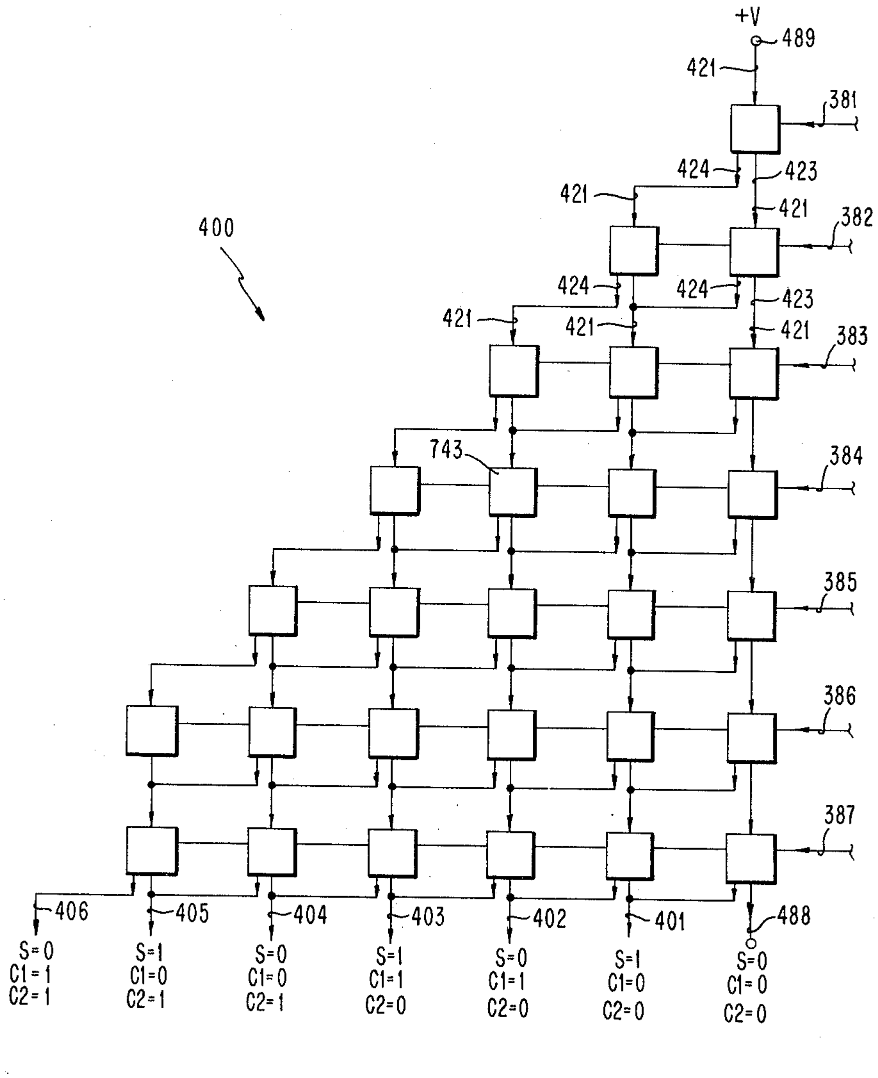
FIG. 4 is a detailed block diagram of the adding circuitry.

The binary representation of the signal on the output lines 401 to 406 and 488 are shown beneath the respective output lines on FIG. 4. For instance, an output signal on output 403 indicates that three of the input lines 381 to 387 have "one" signals thereon; hence, the sum "three" is represented in binary notation as a sum digit equal to "one," a first place carry digit equal to "one" and a second place carry digit to "0".

The input line 421 shown as entering each block from the top in FIG. 4 is connected to input line 721 of the respective block, the input lines 381 to 387 entering the side of the block are connected to the respective inputs 722, output leaving at the bottom on the righthand side is output 423 and the output leaving on the lefthand side is the output 424. As previously described with reference to FIG. 7, if a voltage is applied to the top input, either the right or the left output will be active, depending upon whether the side input has a low resistance path to ground (the side input will have a low resistance path to ground therein to indicate a "one" signal on the line).

The operation of the matrix can be explained by considering that the voltage from voltage supply 489 is passed straight down any column of the matrix until it encounters one of the input lines 381 to 387, which has a "one" signal thereon. At this point, the voltage will be shifted over one column and it will proceed to pass down the next column until it arrives at another row of the matrix where the associated input lines 381 to 387 has a "one" thereon and, at this point, it will again be shifted over one column in the matrix. It should be noted that at each row of the matrix the current from the preceding row goes to ground and a different current source supplies current to the next row.

As previously explained, neither of the outputs of a block will be active if the top input is not active. Hence, once the signal has been shifted from any particular column to the left, the remaining blocks in the column from which the signal was shifted will not have any input or outputs. The net result is that only one of the outputs 401 to 406 or 488 will be active at any one time.

*Circuits 500 and 501 (FIGS. 5a and 5b)*

In order to understand the operation of circuits 500 and 501, it must first be recalled that information can only be written into any of the registers 201 to 208 if a low resistance path exists between the control line 211 for the respective register and ground. Hence, in order to selectively store carry digits in registers 206 and 207 and product digits in register 208, low resistance paths must be selectively provided between ground and lines 211 for registers 206, 207, and 208 (i.e., a low resistance path must be provided between lines 236, 237, and 238 and ground).

During the initial write operation when the multiplicand is being stored in the memory 200, circuits 500 and 501 provide no low resistance paths between lines 236, 237 and 238 and ground; hence, the multiplicand is only stored in the possible partial product registers 201 to 205 and not in registers 206, 207 and 208. However, as the multiplication proceeds, column for column, it is necessary to selectively store carry digits in certain digital positions of registers 206 and 207 and product digits in certain selected positions of register 208 without affecting the information stored in the other registers in the memory. This is done by opening switches 214 for registers 201 to 205. Once switches 214 for registers 201 to 205 have been opened, writing information into registers 206, 207 and 208 by activating read-in lines 241 to 250 will not affect the information stored in registers 201 to 205.

During the multiplication, the output of circuit 400 indicates the number of unmasked "ones" in the particular column of the memory which was read out to produce the inputs to the adding matrix. This information is in the form of a one out of seven code, that is, at any one time only one of the output lines is active. Circuit 500 converts the output of circuit 400 to a binary indication, i.e., a sum digit, a first order carry digit, and a second order carry digit. A low resistance path is provided between ground and: (*a*) line 540 to indicate that the sum digit is "one" whenever either line 401 or 403 is active; (*b*) line 539 to indicate that the first order carry is a "one" whenever either line 402, 403 or 406 is active; and (*c*)line 538 to indicate that the second order carry is a "one" whenever either line 404, 405 or 406 is active.

A signal on line 540 indicates that a sum digit should be stored in the digital order of the memory which was read out to produce the signals on lines 401 to 406 and signals on lines 538 and 539 indicate carries from this same digital order. The function of circuit 501 is to steer the sum digits and the carry digits to the appropriate digital orders of the memory 200. For example, when the third digital column of the memory 200 is read out by activating neon 263, the sum digit which results is stored in the third digital position of the product register 208, the first order carry is stored in the fourth digital position of carry register 206 and the second order digital carry is stored in the fifth digital position of second order carry register 207.

The photoconductors associated with each of the lamps in FIGS. 5*a* and 5*b* are designated by the letters A, B, C, and D. In order to make a reference to a specific photoconductor the reference numeral of the associated lamp followed by the appropriate letter will be used. For example, 531A will designate one of the photoconductors associated with the lamp 531.

Circuit 500 has five lamps, 531 to 536, which are respectively activated by lines 401 to 406. Each of the lamps 531 to 536 has a plurality of photoconductors associated therewith. The photoconductors are positioned so as to receive light from the associated lamps.

The photoconductors in circuit 500 can be divided into two groups: first, those photoconductors which are operative to provide low resistance paths between lines 236, 237, and 238 and ground through line 524; second, those photoconductors which are operative to provide a low resistance path between lines 538, 539 and 540 and voltage source 522.

In order to store information in one of its digital positions of registers 206, 207 and 208 two operations must be performed: first, a low resistance path must be provided between selected line 236, 237 or 238 and ground (this is performed by the first group of photoconductors described above) and, second, a voltage must be applied to one of the lines 241 to 250 (this function is performed by circuit 501 and the second group of photoconductors described above).

Circuit 501 (FIGURE 5*a*) has ten lamps, 521 to 530, one for each digital column of the memory 200. Any lamps 521 to 530 can be activated by applying a voltage to the appropriate terminal 544.

Each of the lamps 521 to 530 has three associated photoconductors positioned to be illuminated thereby. These photoconductors provide connections between lines 538, 539 and 540 and the memory input lines 241 to 250. When one of the lamps is active the associated photoconductors are in the low resistance state and there is: (*a*) a low resistance path between line 540 (for the sum digit) and the column read-in lines for the digital column associated with the active lamp; (*b*) a low resistance path between line 539 (for the first order carry digit) and the next higher order digital column, and (*c*) a low resistance path between line 538 (for the second order carry digit) and the digital order which is two orders above the order associated with the lamp which has been activated. The result is that the sum digit and the carry digits are placed in the appropriate digital orders of the memory 200.

Multiplicand input lines 545 to 549 are respectively connected to memory input lines 245 to 249.

In the embodiment shown herein two sets of lamps which must be sequentially activated are shown, i.e., 261 to 270 and 521 to 530. Instead of having two sets of lamps, one set of lamps could be used. The light from the first lamp in the single set of lamps would illuminate all of the photoconductors herein illuminated by lamps 262 and 522, etc. However, in order to do this some means must be provided for preventing false outputs from the adding circuit 400. This will be illustrated in the second embodiment.

*Summary*

The operation of the device will now be described in a general way but with particular reference to the hardware involved. For easy reference to the drawings it should be recalled that the hundreds digit in a part designation generally specifies the figure wherein the part may be found.

The first step in performing a multiplication is to store the multiplier in the masking registers 300 and to store the multiplicand in registers 201 to 205. The multiplier is stored in the masking registers 300 by closing switches 214 and 215 and selectively activating the multiplier input lines 301 to 305 and the multiplicand is stored in registers 201 to 205 by selectively activating the multiplicand input lines 545 to 549. The selective activation of multiplicand input lines 545 to 549 selectively activates the memory input lines 245 to 249 which stores the multiplicand in the registers 201 to 205 in a shifted fashion. The multiplicand is not stored in registers 206, 207, and 208 at this time as circuit 500 does not provide a low resistance path between lines 236, 237 and 238 and ground.

After the multiplicand is read into registers 201 to 205, switches 214 for registers 201 to 205 are opened so that any subsequent activation of the column read-in lines 221 to 230 will not affect the information stored in registers 201 to 205. Write lines 241 to 250 are activated during the multiplication in order to store carries in registers 206 and 207 and to store the digits of the product in registers 208.

Figure 1A:
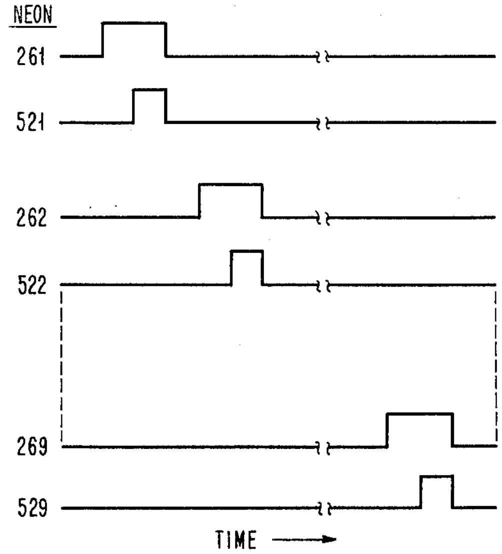

Once the multiplier and multiplicand have been stored the multiplication can begin. The multiplication is sequenced by selectively activating lamps 261 to 270 and 521 to 530 in the correct order (see FIGURE 1*a*).

Lamp 261 is activated first to read out the first digital order of the memory. Register 300 masks the output generated, in accordance with the value of the multiplier, and adding matrix 400 in cooperation with circuit 500 generates sum and carry indications on lines 538, 539, 540, 236, 237 and 238. Next, lamp 521 is activated to steer the sum and carry digits to the appropriate digital columns of the memory, thereby storing sum digits in the first digital position of register 208, the first order carry in the second digital position of register 206 and the second order carry in the third digital position of register 207.

Since the first column of the memory only includes a digit from the first possible partial product, there actually can be no summation and no generation of carries unless a first or second order carry is stored in the first digital position of registers 206 or 207 for some special reason; however, the above explanation was merely meant to be exemplary of the operation of a column of the memory.

After the operation with the first column, the multiplication proceeds column by column. For each column, the appropriate light source 261 to 270 is first activated in order to read the digits of the possible partial product out of the memory 200 through the masking register 300, and into the adding matrix 400, adding matrix 400 and circuit 500 then generate sum and carry digits. Next the appropriate light source 521 to 530 for the particular column is activated in order to store the sums and carry digits in the appropriate digital positions for the registers 206, 207 and 208.

Switches 215 for registers 201 to 208 and switch 388 for masking register 300 can be opened to clear all the registers before the multiplier and multiplicand are entered in the register; however, during the entire multiplication these switches remain closed. Switches 214 for registers 201 to 205 are closed for the initial entry of the multiplicand into registers 201 to 205 and then they are opened. Switches 214 for register 206, 207 and 208 are opened while the multiplicand is being entered into registers 201 to 205 and they are closed for the rest of the multiplication. Switches 216 for registers 201 to 207 are closed during the entire multiplication and switch 216 for register 208 is closed only when it is desired to read the product digits out of register 208.

Since the product digits are generated sequentially, the lowest order digits before the higher order digits, and since the digits of the multiplicand are used sequentially, the lowest order digits first, the product digits can be gated to other similar circuitry as they are produced and the digits of the product generated by one device could be used as the multiplicand for a second multiplication in another device, the second multiplication starting before the first multiplication was completed.

*Second Embodiment*

The second embodiment of the invention is shown in FIGURES 8*a*, 8*b*, 8*c*, 9, and 10. FIGURES 8*a*, 8*b*, and 8*c* fit together (see diagram in the upper left hand corner of the sheet which contains FIGURE 8*a*) to show the overall system. FIGURES 9 and 10 are detailed circuit diagrams of portions of the memory registers shown in FIGURE 8*c*.

The numbering chosen to designate the various components in the second embodiment has been selected with a view towards facilitating an explanation in view of the previous explanation for the first embodiment. Hence, where there are components in the second embodiment which perform substantially the same function as components in the first embodiment, the components in the second embodiment have been designated by the same numeral as the components in the first embodiment. However, the numeral designating the components in the second embodiment is followed by a prime (′) notation.

Dotted lines 101 to 131 indicate light paths. That is, in the actual physical circuit the various photoconductors which are herein connected to any neon by dotted lines are actually placed in light receiving proximity to the respective neons. Herein for ease of drawing the circuitry and for ease in explanation, the neons are not necessarily shown as adjacent to those photoconductors which they activate; however, where any neon activates a photoconductor (and where such is not apparent from its location on the drawing) the neon is connected to the photoconductor by a dotted line.

The various photoconductors are designated by capital letters such as A, B, C. In order to designate a particular photoconductor it is necessary to (*a*) designate the photoconductor by use of a capital letter and (*b*) to identify the neon with which it is associated. For example, photoconductor 871A indicates the uppermost photoconductor in circuit 807.

The second embodiment comprises the memory 805, the memory output circuit 806, the masking register 807, the adding matrix input circuit 808, the adding matrix 809 and the adding matrix output circuitry 810. The memory 805 consists of eight registers 201′ to 208′. The first five of these registers 201′ to 205′ are possible partial product registers. Register 206′ is a second order carry register. Register 207′ is a first order carry register and register 208′ is a sum or product register.

Circuit 806 contains an output neon for each of the memory registers 201′ to 207′. The presence of a "1" in the bit position of a memory register which is being read out at any particular time is indicated by the ignition of the respective neon in circuit 806.

Circuit 807 contains five neons 871 to 875. One neon in circuit 807 is associated with each bit of the multiplier. The multiplier is entered into masking register 807 by the selective activation of multiplier input lines 301′ to 305′. Each neon in circuit 807 has associated therewith a photoconductor A which holds the associated neon "on" once it has been ignited. Switch 877 is provided to clear masking register 807.

Circuit 808 has two neons associated with each of the memory registers 201′ to 207′. These neons are designated as 881 to 887 and 891 to 897. The last digit in the numeral designates which memory register the neon is associated with. The two neons with the same last digit comprise a stage of circuit 808, hence circuit 808 has seven stages.

Two photoconductors are connected in series with each of the neons 891 to 895 and two photoconductors are connected in shunt with each of the neons 881 to 885. In order to activate any one of the neons 891 to 895 both of the series photoconductors must be in their low resistance state i.e. illuminated and in order to extinguish one of the neons 881 to 885 both of the shunt resistors must be in the low resistance state i.e. illuminated. Neons 896 and 897 have one photoconductor connected in series therewith and neon 886 and 887 have one photoconductor connected in shunt therewith. In order to activate neons 896 or 897 the respective series photoconductor must be in the low resistance state and in order to extinguish neons 886 or 887 the respective shunt photoconductor must be in the low resistance state. The photoconductors in series and in shunt with the neon in circuit 808 are illuminated by the neons in circuits 806 and 807 and the neons in circuit 808 illuminate the photoconductors in circuit 809.

If any of the first five stages of circuit 808 receives light signal inputs from <u>both</u> circuits 806 and 807 (or if one of the last two stages receive a signal from the corresponding stage in circuit 806) its respective neon in the series 891 to 897 is active. If the neon in any stage in the series 891 to 897 is not active the neon in the respective stage in the series 881 to 887 is active.

Circuit 809 is an adding matrix or an adding tree. A complete description of the adding tree can be found in the copending application Serial Number 79,823, entitled "Calculating Memory," filed December 30, 1960, by Harold Fleisher and Robert I. Roth.

As previously explained, one (and only one) of the neons in each stage of circuit 808 is active at any time. For example, either neon 881 is active or neon 891 is active. Both neons never are simultaneously active and likewise both are never simultaneously inactive.

Circuit 809 has a voltage source 898 at the top and it has a plurality of outputs 401′ to 407′ at the bottom. Between the input voltage 898 and outputs 401′ to 407′ are seven levels of interconnected photoconductors 851 to 857.

Each level of the adding tree has two light signal inputs, for instance the first level 851 has two inputs 101 and 102. At any time during the operation of the circuit one of the two light signal inputs to any level of the adding tree is active; however, both of the input light signals are never present simultaneously.

Only one of the outputs 401′ to 407′ is active at any particular time. Which output is active depends upon which light signal inputs the adding tree receives. For a more complete description of the operation, see the above reference copending application.

Circuit 810 contains one neon associated with each of the adding tree output lines. Each of these neons 921 to 927 is activated when the associated adding tree matrix output lines are activated. The neons 921 to 927 illuminate photoconductors which are located in memory registers 206′ to 208′ (see FIGURE 10).

The adding tree matrix 809 has seven outputs 931 to 937 which are not used. Circuit 808 and circuit 809 could have been simplified to some extent and these outputs could be eliminated. However, for the sake of uniformity each of the stages in 808 and 809 is shown as identical.

*Detail Explanation of the Structure of Memory 805*

Structure of memory registers 201′ to 205′ is explained first. The overall diagram of the connection between the bit positions in registers is shown in FIGURE 8*c*, and the detailed circuitry within the blocks is shown in FIGURE 9.

The multiplicand is entered into registers 201′ to 205′ in shifted fashion by selectively applying voltages to multiplicand input lines 241′ to 249′. Each of the registers 201′ to 205′ has associated therewith a switch 212′. The purpose of switch 212′ is to clear the registers and during the operation of the system these switches remain closed. Each of the registers 201′ to 205′ has associated therewith an output line respectively 281′ to 285′ and each digital column in the memory has associated therewith a read-in line respectively 221′ to 230′. These lines operate similarly to the corresponding lines in the first embodiment and no further explanation is given.

With reference to the detailed circuitry shown in FIGURE 9, it can be seen that each digital position of the memory has only two neons. This is in contrast with the first embodiment of the invention wherein each digital position of the memory had three neons.

The following discussion relates to digital position 811; however, since the other bit positons are identical it is applicable to any position. There are two neons 950 and 951 and two photoconductors A and B. Photoconductor A is illuminated by both neon 950 and by neon 951. Photoconductor B is only illuminated by neon 951. A data bit is entered into the position by activating line 245′ which activates neon 950. Activation of neon 950 decreases the resistance of photoconductor A thereby activating neon 951. Since neon 951 illuminates photoconductor A the bit position latches. Neon 951 illuminates photoconductor B, hence, if a low resistance path is provided between line 221′ and ground, there is a low resistance path between line 281′ and ground. The bit position can be unlatched by opening switch 212′. During normal operation of the circuit switch 212′ is closed.

The detailed circuitry for registers 206′, 207′, and 208′ is shown in FIGURE 10. FIGURE 10 only shows a portion of each register, however, the bit positions of the registers which are not shown are identical to those shown. The neons shown in dotted lines on the left hand side of FIGURE 10 are the neons which are in the adding tree matrix output circuit 810 (FIGURE 8*b*). Those photoconductors which are connected by dotted lines are all illuminated by the same neon. Furthermore those photoconductors connected by hozizontal dotted lines 128, 129, and 130 can be illuminated by either of the neons indicated on the left hand side of the respective dotted lines.

It should be noted that the same neon many illuminate several sets of photoconductors. For instance, neon 926 illuminates those photoconductors connected by dotted lines 128 and 129.

Since each of the bit positions in registers 206′, 207′ and 208′ is identical only one of the bit positions, i.e. bit position 831 is explained in detail. Bit position 831 has one neon 952 which illuminates photoconductors 952A and 952B (note these photoconductors are designated on FIGURE 10 merely by letters A and B and they are connected to neon 952 by a dotted line).

Information is read into bit position 831 by simultaneously illuminating the two photoconductors C and D which are connected in series with neon 952. Once neon 952 has been ignited it is held on through photoconductor 952A. (Note: switch 211′ is closed during normal operation of the circuit.) The circuit can be cleared by opening switch 211′. It should be noted that information can be read into bit position 831 by simultaneously illuminating (*a*) photoconductor 952D by neon 261′ and (*b*) photoconductor 952C with any one of the neons 924, 925, 926 or 927. The reason for this structure will become apparent during the discussion of the operation of the circuitry.

*Operation of Second Embodiment*

In general the second embodiment operates the same way as did the first embodiment. The memory is read out one column at a time, the masking register suppresses output from those memory registers associatted with digital positions of the multiplier which are zero, the adding matrix produces the sum of the memory outputs as masked by the masking register, and finally circuit 810 stores the sum and the carries in the appropriate position of the memory 805. As in the first embodiment the various columns of the memory 805 are read out by applying voltages to the associated terminal 232′, thereby activating the appropriate lamp 261′ to 270′. The outputs from the memory appear on memory output lines 281′ to 287′. A "1" output from any bit position is manifested as a low resistance path between the appropriate line 281′ to 287′ and ground. The neons in circuit 806 are activated when a low resistance path is provided through their associated lines 281′ to 287′ and ground. (Note, the arrows on lines 281′ to 287′ indicate the direction of the information signal rather than direction of current).

While a multiplication is being performed the multiplier is stored in register 807, and those neons in register 807 associated with digital positions of the multiplier which are "1" are active.

Circuit 808 has a stage consisting of two neon bulbs for each of the registers 201′ to 207′ and at any particular time in the operation of the system one and only one of the neons in each stage of circuit 808 is active. Activation of any neon 891 to 897 indicates a "1" output from the respective stage, whereas activation of any neon 881 to 887 indicates a "0" output from the respective stages. The "1" output from any stage of circuit 808 is active only when the respective stage receives inputs from the corresponding stages of both circuits 807 and 806. That is, the "1" output from any stage of circuit 808 is active only if (*a*) the multiplier digit associated with that particular stage is a "1" and (*b*) the bit being read out of the associated memory register is also a "1."

Adding tree 808 produces the sum of the inputs received. If adding tree 809 receives a "1" input at only one of its stages the output 401′ is active, if it receives a "1" input at two of its stages output 403′ is active, if it receives a "1" input at three of its stages output 403 is active, etc., until if it receives a "1" input at seven of its stages output 407″ is active.

In order to prevent circuit 809 from producing spurious outputs, the switch 899 is opened when circuit 809 is receiving a new set of inputs. After the light signal inputs have appropriately changed the characteristics of each photoconductor in the circuit, switch 899 is closed thereby activating the appropriate output neons in circuit 810.

The output from circuit 899 is essentially in decimal form and before it can be stored in the carry registers 206′ and 207′ and in the sum register 208′ it must be converted to binary information. Circuit 810 performs this function. (This is the function that was performed by circuits 500 and 501 in the first embodiment.)

In the first embodiment once a column of information had been read out of the memory 200 and had been summed by adding matrix 400, no information was stored back in the carry registers 206 and 207 and in the sum register 208 until a separate neon for the particular column was activated, that is, one of the neons 521 to 530 had to be activated in order to store carries and sums in the appropriate digital positions of the appropriate registers. The reason that the neons 521 to 530 were needed in the first embodiment was that the adding matrix did not "settle down" until some time after the information had been read into the adding matrix. Hence, some means was needed to prevent the "apparent information" which appeared at the output of adding matrix 400 from being immediately stored into the carry and sum registers. Neons 521 to 530 performed this function.

In this second embodiment spurious signals cannot appear on the adding matrix output lines 401′ to 407′ because switch 899 is not closed until the characteristics of the photoconductors in the matrix reach a stable condition. Hence, the neons 921 to 927 are never excited by spurious signals.

The information from the output of adding matrix 809 is converted to binary form and stored in the appropriate digital position of registers 206′ to 208′ by the cooperative action of neon 921 to 927 and neon 261′ to 270′.

By reference to FIGURE 10 it can be seen that in order to store a "1" in any particular bit position of one of the registers 206′ to 207′ (i.e. in order to ignite the neon 952 in any one of the memory cells in registers 206′ to 208′) it is necessary that (*a*) one of the neons 921 to 927 (shown on the left hand side of the figure) and (*b*) one of the neons 261′ to 270′ (shown on the bottom of the figure) be simultaneously active.

Each of the neons 261′ to 270′ conditions certain of the bit positions in registers 261′ to 280′ to receive information. The bit position in sum register 208′ which is conditioned by the respective neons 261′ to 270′ is in the same digital column of the memory, as the respective neons 261′ to 270′. Each neon 261′ to 270′ further conditions the bit position in the first order carry register 207′ which is in the next adjacent digital column of the memory and lastly it conditions the bit position in the second order carry register 206′ which is in the next adjacent digital column of the memory.

The result is that when one of the neons 261′ to 270′ is activated to read out a column of the memory it simultaneously conditions the appropriate bit positions in registers 206′, 207′ and 208′, to receive the sum and carry digits which result from the addition of the respective column.

The overall operation of the system will now be discussed in a step by step fashion. Before a multiplication is started switches 212′ and 877 are opened in order to clear memory 805 and masking register 807. Switches 212′ and 877 are then closed. Multiplicand input lines 245′ to 249′ are next selectively activated in accordance with the particular multiplicand, thereby storing the multiplicand in registers 201′ to 205′ in shifted fashion. The shifting of the multiplicand with respect to the digital columns of the memory as it is entered into the memory forms the possible partial product of the multiplicand. The multiplier input lines 201′ to 203′ are selectively activated in accordance with multiplier, thereby entering the multiplier into masking register 807. After the multiplier and multiplicand have been entered in their respective registers the circuit is ready to begin the multiplication.

Neons 261′ to 270′ are sequentially activated in order to sequentially read out various columns of the memory. When any one of the neons 261′ to 270′ is activated a column of the memory is read out, thereby providing low resistance paths between certain of the lines 281′ to 287′ and ground and activating certain of the neons in circuit 806 (i.e. those neons associated with columns wherein a "1" is stored in the bit position which was read out).

The "1" output from any stage of circuit 808 is activated only if there is a "1" both from the output of the respective register of memory 805 and if there is a "1" stored in the associated position of masking register 807. Hence masking register 807 in effect disables those possible partial product registers which do not contain actual partial products. This is identical to the function of the masking register in the first embodiment.

The output from circuit 808 conditions the photoconductors in adding tree 809 and after the photoconductors have been conditioned switch 899 is closed thereby producing outputs on the adding matrix output lines 401′ to 407′. It should be noted that after each of the neons 261′ to 270′ is activated there is a delay and then the switch 899 is closed.

Closing switch 899 activated the appropriate neons in circuit 810 thereby storing the various sum and carry digits in the appropriate positions of the sum and carry registers 206′ to 208′. After the switch 899 is closed and the sum and carry digits have been stored in the memory switch 899 is opened thereby extinguishing the neons which are active in circuit 810. A short period after switch 899 is opened, the neons 261′ to 270′ which was ignited to read out the column of the memory may be extinguished and the next neon in the series 261′ to 270′ may be activated.

Following the sequential activation of all of the neons 261′ to 270′ as described above, the product may be read from register 208′ through outputs 288′.

*Alternate Embodiment of Memory Registers*

The third embodiment of the invention (FIGURE 11) illustrates an alternate simplified manner of constructing the possible partial product registers 201′ to 205′. In the third embodiment each of the bit positions in the various registers merely have one neon, 999, and two photoconductors A and B. Each of the multiplicand input lines 245″ to 249″ is connected to a neon (991 to 995 respectively) and these neons illuminate photoconductor A in the appropriate storage positions. In this embodiment light paths which are common to the various bit positions replace the wires that connected these positions in the other embodiment. Each cell common to any light path is latched by the activation of the particular light source. The B photoconductor in each cell is for read out. Since the operation of the third embodiment is idential to the operation of the second embodiment, no further discussion of the operation of the third embodiment will be given.

From the three embodiments of the invention shown herein it is obvious that the details of the circuits embodying the present invention could take various and sundry forms.

While the invention has been particularly shown and described with reference to preferred embodiments thereof, it will be understood by those skilled in the art that various changes in form and details may be made therein without departing from the spirit and scope of the invention.

What is claimed is:

1. In a device for generating data manifestations representing a product from data manifestations representing a multiplicand and data manifestations representing a multiplier, said product, multiplicand and multiplier each having a plurality of digital positions;

a memory for storing data manifestations, said memory having a plurality of multiplicand storage registers, one for each digit of said multiplier, each of said multiplicand storage registers having one storage position for each digit of said multiplicand, each storage position being associated with a particular digital position, said multiplicand storage registers arranged in series from a first to a last, the lowest order storage position of each multiplicand storage register beyond the first being associated with a digital position higher by one than the lowest order digital position of the preceding multiplicand storage register, a product storage register having a plurality of storage positions, each storage position being associated with a particular digital position, the lowest order storage position of said product register being associated with the same digital position as the lowest order storage position of said first multiplicand storage register, and a plurality of carry storage registers for storing carries between digital positions, each carry register being associated with a different order carry, means for storing the data manifestations representing said multiplicand in each of said multiplicand storage registers, register output means for each multiplicand register and for each carry register, a plurality of read out means, one for each digital position of said memory, for controlling each register output means in response to data stored in the respective digital position of the associated register, a multiplier register for storing the data manifestations representing said multiplier, said register having one storage position associated with each digit of said multiplier, means for respectively masking the multiplicand register output means in response to data stored in associated positions of said multiplier register, sum output means, a plurality of carry output means, each carry output means being associated with a different order carry, logical adding means responsive to the masked register output means for generating data manifestations on said sum and on said carry output means representing the sum and carries of the data manifestations from all of said register output means, means responsive to said carry output means for storing the respective carries in the respective carry registers at the respective carry digit positions appropriately displaced from the respective position which was read out, means responsive to said sum output means for storing data manifestations representing the sum generated by said logical circuits in the respective digital position of the product register which was read out to activate the register output lines, whereby after each of said read out means has been successively activated the data manifestations in said product register will represent the product of said multiplicand and said multiplier.

2. In a binary device for generating data manifestations representing a multiplicand and data manifestations representing a multiplier, said multiplicand and multiplier each having a plurality of digital positions;

a memory for storing data manifestations, said memory having a plurality of multiplicand storage registers, one for each digit of said multiplier, each of said registers having one bistable storage position for each digit of said multiplicand, each storage position being associated with a particular digital position, said multiplicand storage registers being arranged in a series from a first to a last, the lowest order storage position of each multiplicand storage register beyond the first being associated with a digital position higher by one than the lowest order digital position of the preceding register, a product storage register having a plurality of bistable storage positions, each storage position being associated with a particular product digit the lowest order storage position of said product register being associated with the same digital position as the lowest order storage position of said first multiplicand storage register, and a plurality of carry storage registers for storing carries between digital positions, each carry register being associated with a different order carry, means for setting the bistable storage elements in each multiplicand storage register to represent said multiplicand, register output means for each multiplicand register and for each carry register, a plurality of read out means, one for each digital position of said memory for controlling the register output means in response to the state of the respective storage element of the respective register, a multiplier storage register, said register having one bistable storage element for each digit of said multiplier, means for setting the bistable storage elements in the multiplier storage register to represent said multiplier, means for respectively masking register output means in response to the state of the associated bistable storage element of said multiplier register, a plurality of sum-carry output means, each associated with a different sum-carry combination, logical adding means responsive to the masked register output means for controlling the sum-carry output means to generate the sum and carries of the data manifestations of all of said register output means, means responsive to said sum-carry output means for storing the respective carries in the respective carry registers at the respective carry digit positions appropriately displaced from the digital position which was read out, means responsive to said sum-carry output means for storing the data manifestations representing the sum generated by said logical circuitry sum in the respective digital position of the product register which was read out to activate the register output lines, whereby after each of said read out means has been successively activated the data manifestations in said product register will represent the product of said multiplicand and said multiplier.

3. In a device for generating data manifestations representing a multiplicand and data manifestations representing a multiplier, said multiplicand and multiplier each having a plurality of digital positions;

a product storage register, said register having a plurality of bit storage positions, each of said bit storage positions being respectively associated with successive digital positions starting from a base digital position, a plurality of multiplicand storage registers, one for each digit of said multiplier, each of said multiplicand storage registers having one storage position for each digit of said multiplicand, said multiplicand storage registers being arranged in a series from a first to a last register, the lowest order storage position of each register beyond the first being associated with a digital position higher by one than the lowest order digital position of the preceding register, the lowest order digital position of the first multiplicand storage register being associated with said base digital position, a plurality of carry storage registers for storing carries between digital positions, each carry register being associated with a different order carry, means for storing the data manifestations representing said multiplicand in each of said multiplicand storage registers,
register output means for each multiplicand storage register and for each carry register,
a plurality of read out means, one for each digital position, for controlling each register output means in response to data stored in the respective digital position of the associated register,
a multiplier register for storing the data manifestations representing said multiplier, said register having one storage position associated with each digit of said multiplier,
means for respectively masking each multiplicand register output means in response to data stored in associated positions of said multiplier register,
logical means responsive to the masked register output means for generating signals representing the sum and carries of the data manifestations on all of said masked register output means,
sum output means,
a plurality of carry output means, each carry output means being associated with a different order carry,
means responsive to said logical means for activating said sum output means and said carry output means,
means responsive to said carry output means for storing the respective carries in the respective carry registers at the respective carry positions displaced from the digital position which was read out to activate the register output lines,
means responsive to said sum output means for storing the data manifestations representing the sum generated by said logical circuitry in the respective digital position which was read out to activate the register output lines,
whereby after each of said read out means has been successively activated the data manifestations in said product register will represent the product of said multiplicand and said multiplier.

4. In a device for generating data manifestations representing a product from data manifestations representing a multiplicand and data manifestations representing a multiplier, said product, multiplicand and multiplier each having a plurality of digital positions;
a plurality of partial product registers for storing possible partial products of said multiplicand, each partial product register being associated with a particular digital position of said multiplier,
a plurality of carry storage registers for storing carries between digital positions, each carry register being associated with a different order carry,
a product storage register,
multiplicand input means,
means responsive to said multiplicand input means for entering said possible partial products in said partial product registers,
register output means for each partial product storage register and for each carry register,
a plurality of read out means, one for each digital position of said registers, for controlling each register output means in response to data stored in the respective digital position of the associated register,
a multiplier register for storing the data manifestations representing said multiplier,
means for respectively masking said register output means in response to data stored in associated positions of said multiplier register,
logical means responsive to the masked register output means for generating signals representing the sum and carries of the data manifestations on all of said masked register output means,
sum output means,
a plurality of carry output means, each carry output means being associated with a different order carry,
means responsive to said logical means for activating said sum output means and said carry output means, means responsive to said carry output means for storing the respective carries in the respective carry registers at the respective carry positions appropriately displaced from the digital position which was read out to activate the register output lines,
means responsive to said sum output means for storing the data manifestations representing the sum generated by said logical circuitry in the respective digital position which was read out to activate the register output lines,
whereby after each of said read out means has been successively activated the data manifestations in said product register will represent the product of said multiplicand and said multiplier.

5. The device described in claim 1 wherein
each of said bit storage positions comprises a first light source connected in series with a first photoconductor and a first voltage source, said first light source being positioned to illuminate said first photoconductor, said first photoconductor thereby forming a photoelectric latch circuit,
said means for storing said multiplicand in said storage register comprises means for selectively illuminating said first photoconductors,
each of said read out means comprises a series circuit which includes a voltage source for providing a low resistance path to ground, a second photoconductor positioned to be illuminated by said first light source, a second light source and a switching means, whereby said second light source is activated when said first light source illuminates said second photoconductor and said switching means provides a low resistance path to ground,
each of said register output means comprises a circuit with a parallel path for each bit position in the associated register, each parallel path including a photoconductor connecting said circuit to ground, said photoconductor being positioned to be illuminated by the second light source in the associated bit position,
said multiplier register comprising a photoelectric latch circuit for each digital position of the multiplier, said latch circuit including a light source and a photoconductor positioned to be illuminated thereby, said photoconductor being connected for maintaining said light source active,
said means for masking said register output means comprising a photoconductor in series with each of said register output means, said photoconductor being positioned to be illuminated by the light source in the latch circuit of the associated bit position of the multiplier register,
said logical adding means comprising
a plurality of input means having two signal states, the first state indicating a binary "1" and the second state indicating a binary "0,"
a plurality of outputs including one for each possible number of "1" signal inputs,
and means for activating the output corresponding to the number of "1" signals present at any time, said means including
a plurality of steering circuits arranged in rows and columns with one column for each output means and one row for each input means,
each of said steering circuits having a first input and a second input and a first output and a second output,
means for activating said first output if a voltage signal is present on said second input and said first input does not provide a low resistance path to ground (thereby indicating a "0" input signal on the first input means) and for providing a voltage signal on said second output means when a voltage signal is present on said second input means and there is a low resistance path between said first signal input means and ground (thereby indicating "1" signal on said input means) said last recited means comprising a first light source connected between said second input means and said first input means, a second light source connected between said second input means and ground, a voltage source, a photoconductor positioned in light receiving proximity to said first light producing means, said first photoconductor connecting said voltage source to said second output, a second photoconductor positioned in light receiving proximity to said second light source for connecting said voltage source to said first output means, and third photoconductor means positioned in light receiving proximity to said first light producing means, said photoconductor being connected to short out the voltage across said second light producing means when said first light producing means is active.

6. In a device for generating a product from a multiplicand and a multiplier, a memory having a plurality of bit positions arranged in rows and columns, each column of said memory being associated with a different digital order, means for storing all of the possible partial products of said multiplicand in respectively different rows of said memory, multiplier storage means for storing said multiplier, means responsive to said multiplier storage means for selecting those rows of memory for read out which store partial products corresponding to the digits of said multiplier, read out means for reading out from bit positions in selected rows of said memory one column at a time, logical adder means for generating the sum and carries of the selected outputs from each column of said memory, means for storing in the appropriate higher order columns of said memory the carries generated by said logical adder, said memory being read out, column for column, starting with the lowest order column, the sum digits generated by said logical adder representing the digits of said product.

7. In a device for generating data manifestations representing a product from data manifestations representing a multiplicand and data manifestations representing a multiplier, said product, multiplicand and multiplier each having a plurality of digital positions;

a memory for storing data manifestations, said memory having a plurality of multiplicand storage registers, one for each digit of said multiplier, each of said multiplicand storage registers having one storage position for each digit of said multiplicand, each storage position being associated with a particular digital position, said multiplicand storage registers being arranged in a series from a first to a last, the lowest order storage position of each multiplicand storage register beyond the first being associated with a digital position higher by one than the lowest order digital position of the preceding multiplicand storage register, a product storage register having a plurality of storage positions, each storage position being associated with a different digital order, the lowest order storage position of said product register being associated with the same digital position as the lowest order storage position of said first multiplicand storage register, a plurality of carry storage registers for storing carries between digital positions, each carry register being associated with a different order carry, means for storing the data manifestations representing said multiplicand in each of said multiplicand storage registers, register output means for each multiplicand register and for each carry register, a plurality of read out means, one for each digital position of said memory, for controlling each register output means in response to data stored in the respective digital position of the associated register, a multiplier register for storing the data manifestations representing said multiplier, said register having one storage position associated with each digit of said multiplier, means for respectively masking said multiplicand register output means in response to data stored in associated positions of said multiplier register, logical adding means responsive to said masked register output means for generating signals representing the sum and carries of the data manifestations from said masked register output means, said adding means including a plurality of output means, one for each possible number of input signals, the activation of any output means indicating the presence of the corresponding number of inputs, means responsive to the output means of said logical adder which represent binary carries for storing the respective carries in the respective carry registers at the respective carry positions displaced from the respective position which was read out to activate the register output lines, means responsive to the output means of said logical adder which represent binary sum digits for storing data manifestations representing the sum generated by said logical circuits in the respective digital position of the product register which was read out to activate the register output lines whereby after each of said read out means has been successively activated the data manifestations in said product register will represent the product of said multiplicand and said multiplier.

8. In a device for generating a product from a multiplicand and a multiplier, a memory having a plurality of bit positions arranged in rows and columns, each column of said memory being associated with a different digital order, means for storing all of the possible partial products of said multiplicand in respectively different rows in said memory, read out mean for reading out bit positions in selected rows of said memory one column at a time, multiplier storage means for storing said multiplier, means responsive to said multiplier storage means for selecting those rows for read out which store possible partial products corresponding to the digits of said multiplier, logical adder means for generating the sum and carries of the selected outputs from each column of said memory, means for storing in the appropriate higher order column of said memory the carries generated by said logical adder, means for storing in the appropriate column of said memory the sum digits generated by said logical adder, said memory being read out, column for column, starting with the lowest order column, the sum digits generated by said logical adder representing the digits of said product.

9. In a device for generating a product from a multidigit binary multiplicand and a multidigit binary multiplier, a memory having columns and rows of bistable storage devices, each column being associated with a different digital order, means for storing said multiplicand in a plurality of rows of said memory in shifted fashion, a different one of said rows storing said multiplicand being associated with each digit of said multiplier, thereby forming all the possible partial products of said multiplicand, means for sequentially reading out the columns of said memory in ascending order, means for masking the read out of rows of said memory associated with digits of said multiplier which are zero, adding means for generating the binary sum and carries of the information read from each column of said memory as it is read out, and means responsive to said adding means and responsive to said read out means for storing the carries generated by said adding means in the appropriate higher order column of said memory.

10. Photoconductor adding means comprising a plurality of input means having two signal states, the first state indicating a binary "1" and the second state indicating a binary "0,"

a plurality of output means including one for each possible number of "1" signal inputs, means for activating the output corresponding to the number of "1" signals present at any time, said means including a plurality of steering circuits arranged in rows and columns including one column for each output means and one row for each input means, each of said steering circuits having a first input and a second input and a first output and a second output, means for activating said first output if a voltage signal is present on said second input and said first input does not provide a low resistance path to ground (thereby indicating a "0" input signal on the first input means) and for providing a voltage signal on said output means when voltage signal is present on said second input means and there is a low resistance path between said first signal input means and ground (thereby indicating "1" signal on said input means), said last recited means comprising a first light source connected between said second input means and said first input means, a second light source connected between said second input means and ground, a voltage source, a photoconductor positioned in light receiving proximity to said first light producing means, said first photoconductor connecting said voltage source to said second output, a second photoconductor positioned in light receiving proximity to said second light source for connecting said voltage source to said first output means, and third photoconductor means positioned in light receiving proximity to said first light producing means, said photoconductor being connected to short out the voltage across said second light producing means when said first light producing means is active.

11. In a device for generating a product from a multiplicand and a multiplier, a memory having a plurality of bit positions arranged in rows and columns with one column for each possible digital position of said product and with one row for each possible partial product, for each possible carry and for the product, means for storing the digits of the possible partial products of said multiplicand in their associated respective registers, output means for each row of said memory, read out means for each column of said memory for reading out from the bit position in the associated columnar position of each possible partial product register and each carry register and for activating the associated output means in accordance with the bit position which is read out, multiplier storing means for storing said multiplier, means responsive to said multiplier storage means for disabling selected memory output means, logical adder means connected for generating the sum and carries of the outputs from each column of said memory from rows which are not disabled, means for storing in the appropriate higher order column of said memory the carries generated by said logical adder, said memory being read out sequentially by column starting with the lowest order column, the sum digits generated by said logical adder representing the digits of said product.

12. An arithmetic device comprising, a memory having a plurality of bit positions arranged in rows and columns, each column of said memory being associated with a different digital order.

readout means for reading out from the bit positions of said memory one column at a time, logical adder means for generating the sum and carries of the outputs from each column of said memory, means for storing, in the appropriate higher order columns of said memory, the carries generated by said logical adder, said memory being read out, column by column, starting with the lowest order column, the sum digits generated by said logical adder representing the digits of the sum of the numbers stored in said memory.

References Cited in the file of this patent

UNITED STATES PATENTS

| | | |
|---|---|---|
| 2,404,047 | Florey et al. | June 16, 1946 |
| 2,428,812 | Rajchman | Oct. 14, 1947 |
| 2,638,267 | Hartley et al. | May 12, 1953 |
| 2,672,283 | Havens | Mar. 16, 1954 |
| 2,808,205 | Raymond et al. | Oct. 1, 1957 |
| 2,851,219 | Hussey | Sept. 9, 1958 |

UNITED STATES PATENT OFFICE
CERTIFICATE OF CORRECTION

Patent No. 3,163,749 December 29, 1964

Robert I. Roth et al.

It is hereby certified that error appears in the above numbered patent requiring correction and that the said Letters Patent should read as corrected below.

Column 8, lines 11 and 12, strike out "block, the input lines 381 to 387 entering the side put signals" and insert instead -- input line and ground to indicate a "zero." Output signals --; column 13, line 73, for "hozizontal" read -- horizontal --; column 14, line 30, for "associatted" read -- associated --; column 22, line 47, for "mean" read -- means --; column 23, line 35, after "said" insert -- second --; column 24, line 34, for "order." read -- order, --.

Signed and sealed this 1st day of June 1965.

(SEAL)
Attest:

ERNEST W. SWIDER
Attesting Officer

EDWARD J. BRENNER
Commissioner of Patents